US012601709B2

(12) United States Patent
Lee et al.

(10) Patent No.: US 12,601,709 B2
(45) Date of Patent: Apr. 14, 2026

(54) SEMICONDUCTOR DEVICE WITH SENSOR AND MANUFACTURING METHOD THEREOF

(71) Applicant: Taiwan Semiconductor Manufacturing Company, Ltd., Hsinchu (TW)

(72) Inventors: Wei Lee, Hsinchu City (TW); Chung-Liang Cheng, Changhua County (TW); Pei-Wen Liu, Hsinchu City (TW); Ke-Wei Su, Hsinchu County (TW); Kuan-Lun Cheng, Hsin-Chu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 755 days.

(21) Appl. No.: 17/830,359

(22) Filed: Jun. 2, 2022

(65) Prior Publication Data

US 2023/0393092 A1 Dec. 7, 2023

(51) Int. Cl.
*G01N 27/414* (2006.01)

(52) U.S. Cl.
CPC ................................ *G01N 27/4148* (2013.01)

(58) Field of Classification Search
CPC ..... G01N 27/4148; H10D 88/00; H10D 86/60
USPC ........................................................ 257/257
See application file for complete search history.

(56) References Cited

U.S. PATENT DOCUMENTS

| | | | |
|---|---|---|---|
| 8,871,549 B2 * | 10/2014 | Ellis-Monaghan | .......................... G01N 27/4148 257/253 |
| 11,302,813 B2 * | 4/2022 | Reznicek | ........... H10D 30/6212 |
| 11,742,286 B2 * | 8/2023 | Hsu | ........................ H01L 23/535 257/774 |
| 11,881,451 B2 * | 1/2024 | Chuang | ............... H01L 23/5226 |
| 2014/0225166 A1 * | 8/2014 | Ellis-Monaghan | .......................... H10D 30/021 257/253 |
| 2016/0209355 A1 * | 7/2016 | Tseng | .................. G01N 27/4145 |
| 2017/0062614 A1 * | 3/2017 | Basker | ............... H10D 30/6211 |
| 2018/0202958 A1 * | 7/2018 | Ali | .......................... G01N 27/16 |
| 2020/0041447 A1 * | 2/2020 | Chang | .................... H10D 48/30 |
| 2020/0066894 A1 * | 2/2020 | Frougier | .............. H10D 30/014 |
| 2020/0126798 A1 * | 4/2020 | Lin | ....................... H10D 30/014 |
| 2020/0173958 A1 * | 6/2020 | Chiang | ............. G01N 33/5438 |
| 2021/0193829 A1 * | 6/2021 | Reznicek | ............... H10D 30/62 |
| 2021/0313331 A1 * | 10/2021 | Yang | .................. H10D 30/6219 |
| 2022/0359652 A1 * | 11/2022 | Lin | .................... H10D 30/0212 |

(Continued)

*Primary Examiner* — Jami Valentine Miller
(74) *Attorney, Agent, or Firm* — JCIPRNET

(57) ABSTRACT

A semiconductor device includes a substrate, an interconnect, and a sensor. The substrate includes devices therein and has a front side and a rear side opposite to the front side. The interconnect is disposed on the front side and electrically coupled to the devices. The sensor is disposed over the substrate and in the interconnect, and includes a sensing element and a reference element. The sensing element is disposed in a topmost layer of the interconnect and exposed therefrom, where the sensing element is electrically coupled to a first device of the devices through the interconnect. The reference element is disposed in the topmost layer of the interconnect and exposed therefrom, where the reference element is laterally spaced from the sensing element and is electrically coupled to a second device of the devices through the interconnect.

20 Claims, 18 Drawing Sheets

(56) References Cited

U.S. PATENT DOCUMENTS

2022/0359687 A1* 11/2022 Liaw ..................... B82Y 10/00
2022/0416036 A1* 12/2022 Chen ................... H10D 64/017
2023/0393093 A1* 12/2023 Lee ....................... H10D 86/60
2023/0408443 A1* 12/2023 Lee ................... G01N 27/4145

* cited by examiner

SEMICONDUCTOR DEVICE WITH SENSOR AND MANUFACTURING METHOD THEREOF

BACKGROUND

An ion-sensitive transistor is a transistor used for characterizing and/or identifying a target in a fluid. The target reacts with and/or binds to a sensing layer in the fluid to change a surface potential difference at the sensing layer. The change in the surface potential difference changes a threshold voltage of the ion-sensitive transistor, which may be used to characterize and/or identify the target. The ion-sensitive transistors are widely used in different life-science applications, ranging from environmental monitoring and basic life science research to Point-of-Care (PoC) in-vitro molecular diagnostics.

BRIEF DESCRIPTION OF THE DRAWINGS

Aspects of the disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
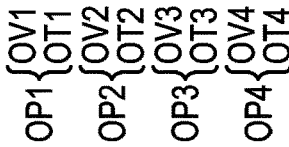
FIG. 1 through FIG. 6 are schematic cross-sectional views of various stages in a manufacturing method of a semiconductor device in accordance with some embodiments of the disclosure.

The following disclosure provides many different embodiments, or examples, for implementing different features of the provided subject matter. Specific examples of components, values, operations, materials, arrangements, or the like, are described below to simplify the disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In addition, terms, such as "first", "second", "third" and the like, may be used herein for ease of description to describe similar or different element(s) or feature(s) as illustrated in the figures, and may be used interchangeably depending on the order of the presence or the contexts of the description.

It should be appreciated that the following embodiment(s) of the disclosure provides applicable concepts that can be embodied in a wide variety of specific contexts. The specific embodiment(s) discussed herein is merely illustrative and is related to a semiconductor device including a sensor component (or device) of an ion-sensing transistor disposed in an interconnect formed during back-end-of-line (BEOL) processes, and is not intended to limit the scope of the disclosure. In accordance with some embodiments, one or more than one sensor component (or device) is disposed on a surface of a topmost metallization pattern inside an interconnect of the semiconductor device, where the sensor component (or device) is formed with a thin film transistor (TFT) having a channel of indium gallium zinc oxide (IGZO) with a gate dielectric of a high-k dielectric material. In the case, such thin film transistor is able to formed in the interconnect during the BEOL processes, thus the manufacturing process of the semiconductor device is simplified, thereby lowering the manufacturing cost.

Figure 7:
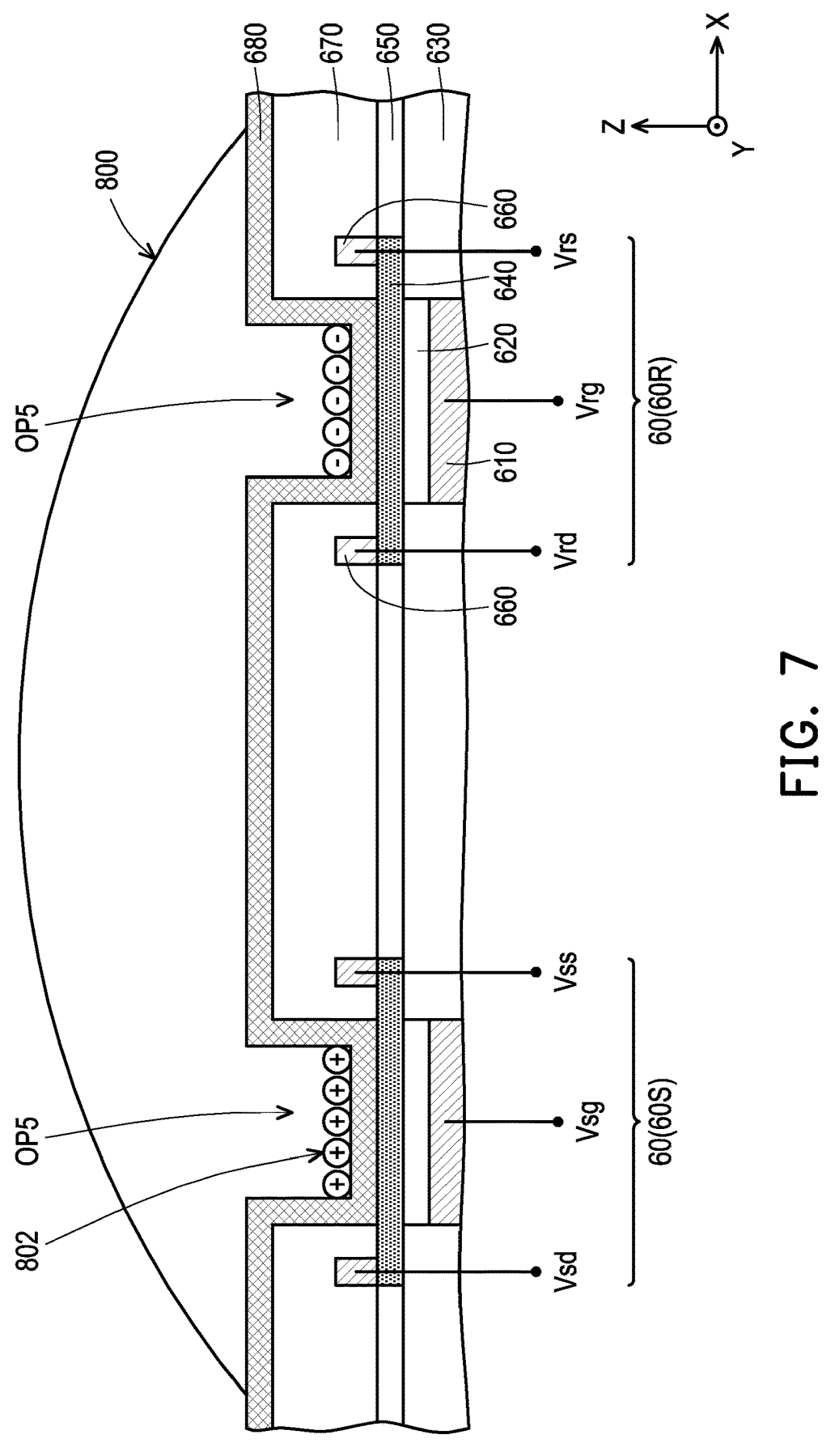
FIG. 7 is a schematic cross-sectional view of a semiconductor device during the operation in accordance with some embodiments of the disclosure.
Figure 8:
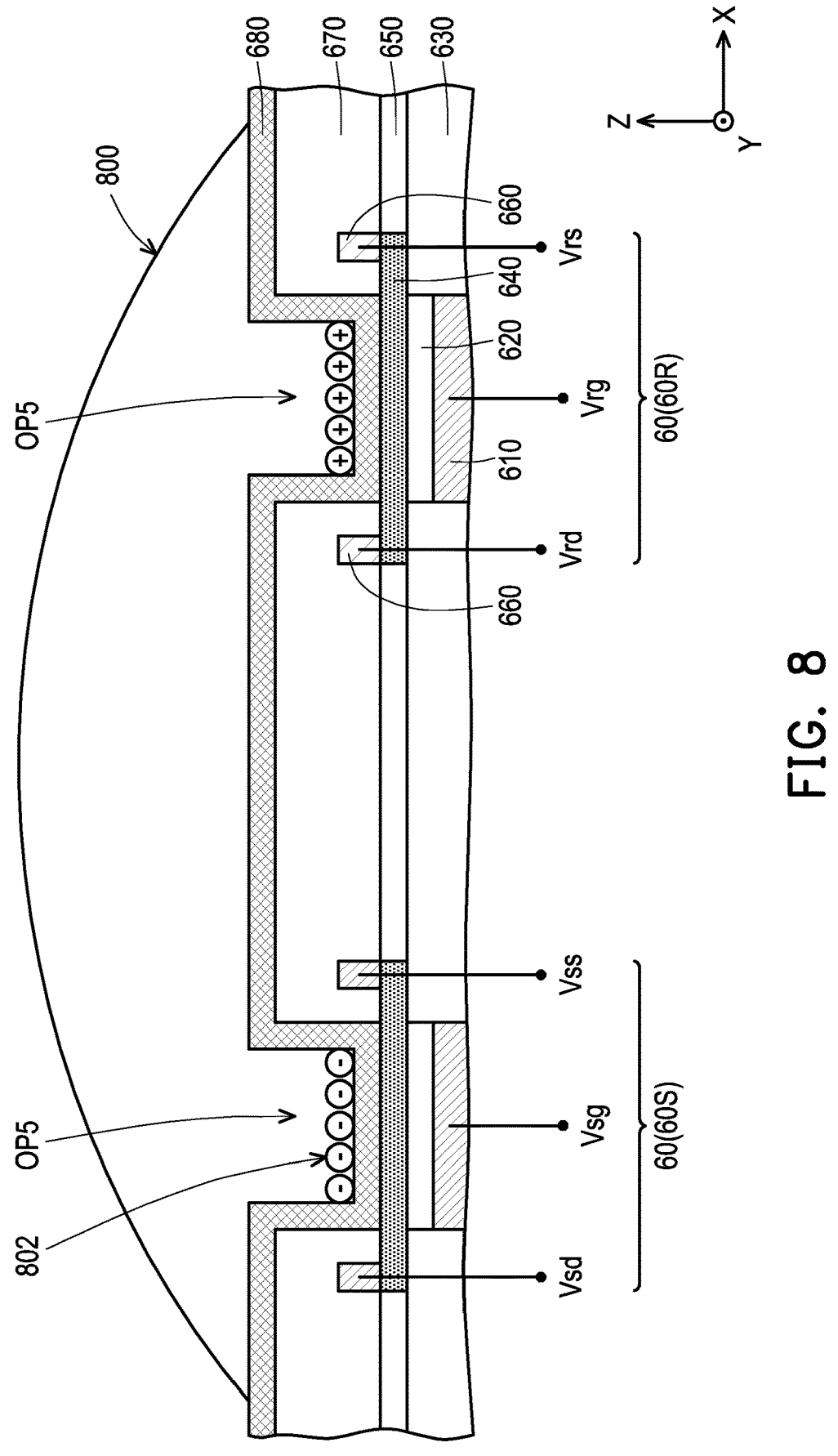
FIG. 8 is a schematic cross-sectional view of a semiconductor device during the operation in accordance with some alternative embodiments of the disclosure.
Figure 10:
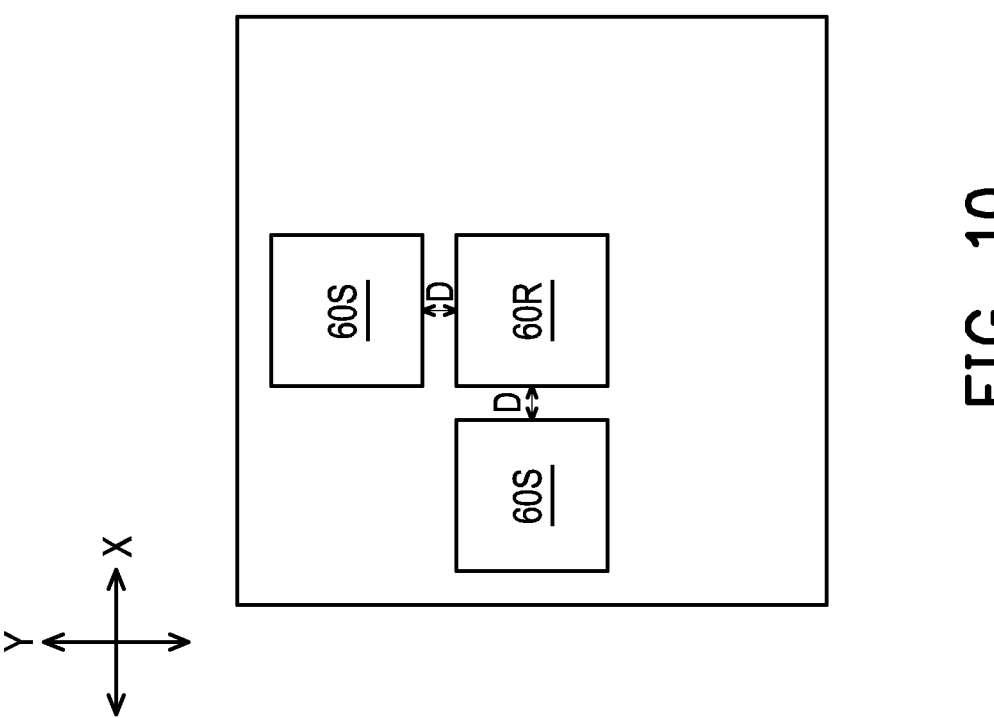
FIG. 9 through FIG. 18 are schematic plane views respectively illustrating a relative position between sensor components of a semiconductor device in accordance with some embodiments of the disclosure.
Figure 9:
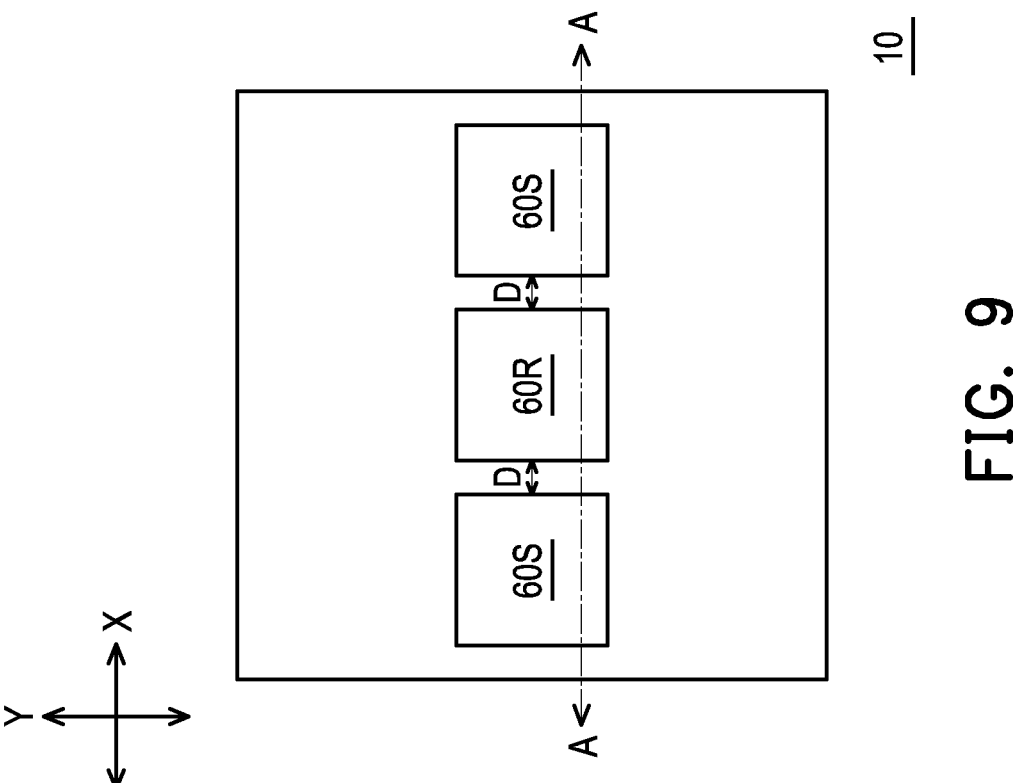
Figure 12:
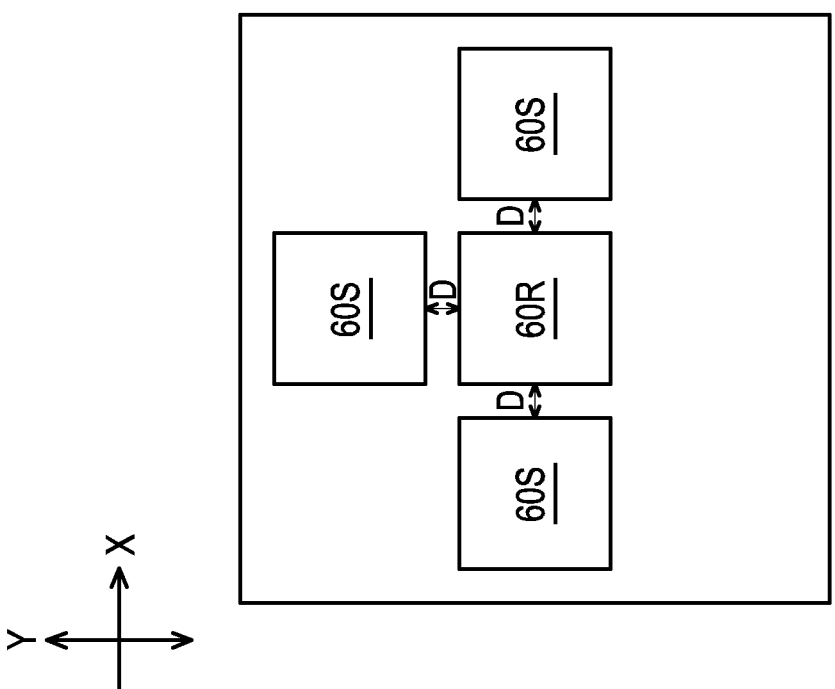
Figure 11:
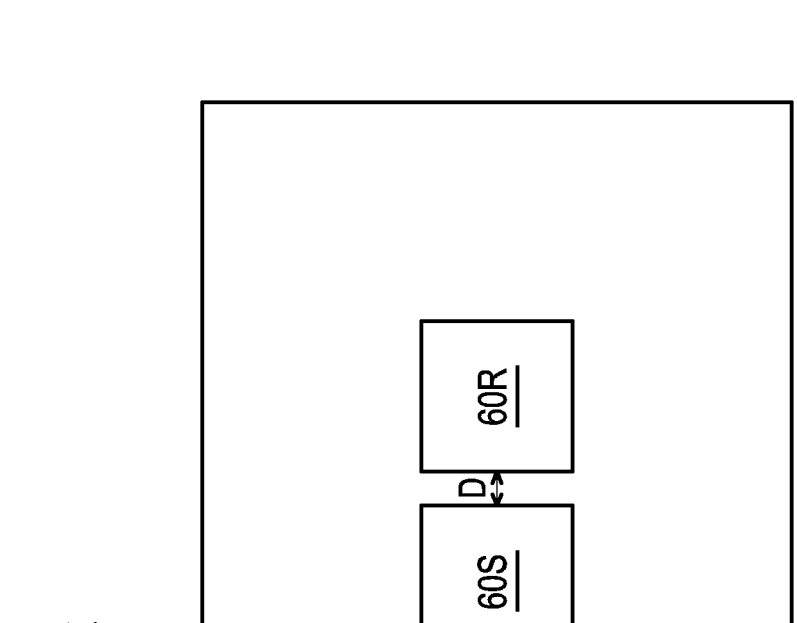
Figure 11:
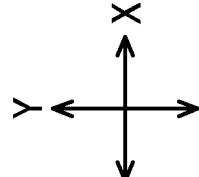
Figure 14:
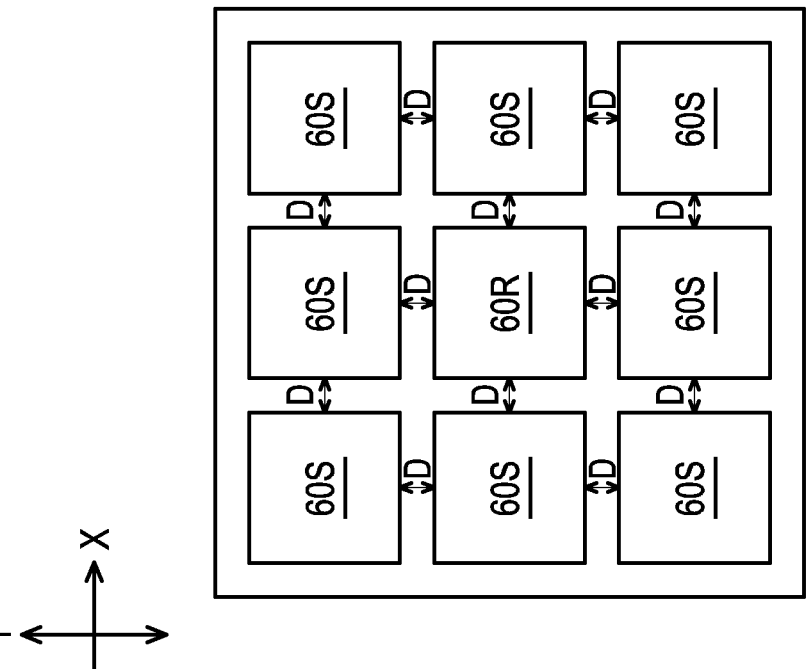
Figure 14:
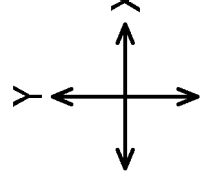
Figure 13:
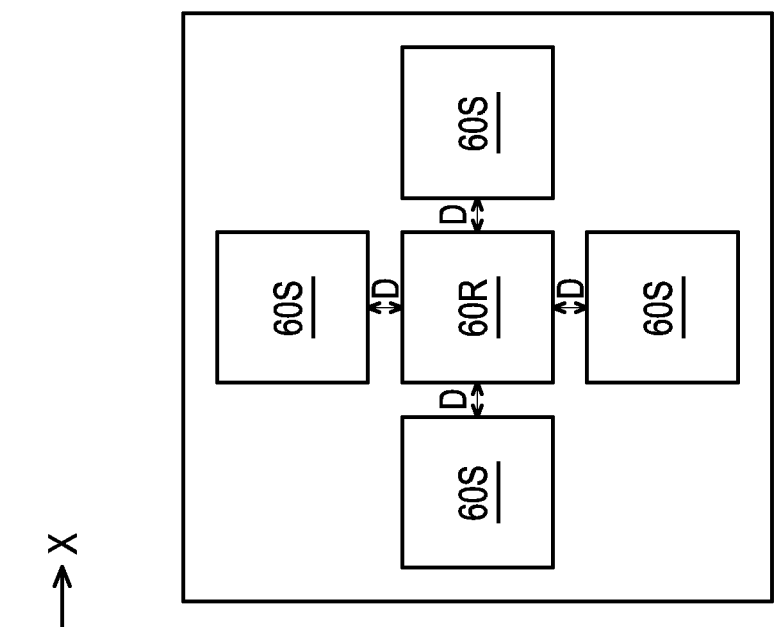
Figure 16:
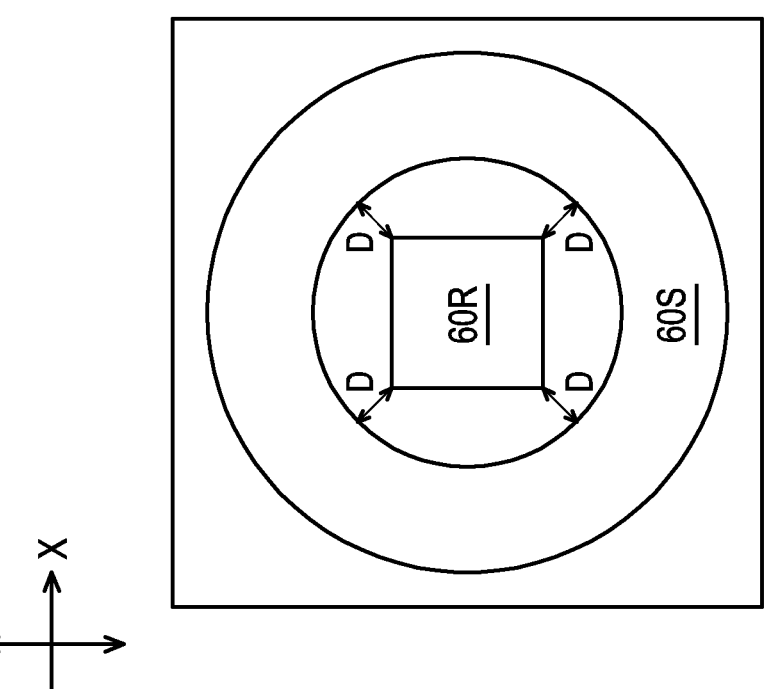

FIG. 1 through FIG. 6 are schematic cross-sectional views of various stages in a manufacturing method of a semiconductor device 10 in accordance with some embodiments of the disclosure. FIG. 7 is a schematic cross-sectional view of the semiconductor device 10 during the operation in accordance with some embodiments of the disclosure. FIG. 8 is a schematic cross-sectional view of the semiconductor device 10 during the operation in accordance with some alternative embodiments of the disclosure. FIG. 9 through FIG. 18 are schematic plane views respectively illustrating a relative position between sensor components of a semiconductor device in accordance with some embodiments of the disclosure, where the schematic cross-sectional views of FIG. 1 through FIG. 6 are taken along a line A-A depicted in the schematic plane view of the semiconductor device 10 as shown in FIG. 9. In embodiments, the manufacturing method is part of a wafer level packaging process. It is to be noted that the process steps described herein cover a portion of the manufacturing processes used to fabricate the semiconductor device involving a semiconductor component such as a semiconductor sensor. The embodiments are intended to provide further explanations but are not used to limit the scope of the disclosure. In the disclosure, it should be appreciated that the illustration of components throughout all figures is schematic and is not in scale.

Referring to FIG. 1, in some embodiments, an initial structure is provided. For example, the initial structure includes a substrate 200 including a wide variety of devices (also referred to as semiconductor devices) formed in a semiconductor substrate 202 and a stack structure disposed on the substrate 200, as shown in FIG. 1. The devices may include active components, passive components, or a combination thereof. The devices may include integrated circuits devices. The devices may include transistors, capacitors, resistors, diodes, photodiodes, fuse devices, or other similar devices. The functions of the devices may include memory, processors, sensors, amplifiers, power distribution, input/output circuitry, or the like.

In some embodiments, the semiconductor substrate 202 includes a bulk semiconductor substrate, a crystalline silicon substrate, a doped semiconductor substrate (e.g., p-type semiconductor substrate or n-type semiconductor substrate), a semiconductor-on-insulator (SOI) substrate, or the like. In certain embodiments, the semiconductor substrate 202 includes one or more doped regions or various types of doped regions, depending on design requirements. In some embodiments, the doped regions are doped with p-type and/or n-type dopants. For example, the p-type dopants are boron or $BF_2$ and the n-type dopants are phosphorus or arsenic. The doped regions may be configured for an n-type metal-oxide-semiconductor (NMOS) transistor or a p-type MOS (PMOS) transistor. The substrate 200 may be a wafer, such as a silicon wafer. Generally, the SOI substrate is a layer of a semiconductor material formed on an insulator layer. The insulator layer is, for example, a buried oxide (BOX) layer, a silicon oxide layer, or the like. Other substrates, such as a multi-layered or gradient substrate may also be used. In some alternative embodiments, the semiconductor substrate 202 includes a semiconductor substrate made of other suitable elemental semiconductor, such as diamond or germanium; a suitable compound semiconductor, such as gallium arsenide, silicon carbide, gallium phosphide, indium phosphide, indium arsenide and indium antimonide, an alloy semiconductor such as SiGe, GaAsP, AlInAs, AlGaAs, GaInAs, GaInP and GaInAsP or combinations thereof. For example, the semiconductor substrate 202 is a silicon bulk substrate.

As shown in FIG. 1, the devices such as a transistor 30, a transistor 40, and a transistor 50 may be formed in the semiconductor substrate 202. In some embodiments, a plurality of isolation structures 204 are formed in the semiconductor substrate 202 for separating the transistor 30, the transistor 40, and the transistor 50. In certain embodiments, the isolation structures 204 are trench isolation structures. In other embodiments, the isolation structures 204 includes local oxidation of silicon (LOCOS) structures. In some embodiments, the insulator material of the isolation structures 204 includes silicon oxide, silicon nitride, silicon oxynitride, a spin-on dielectric material, or a low-k dielectric material. For example, the low-k dielectric material generally has a dielectric constant lower than 3.9. In one embodiment, the insulator material may be formed by chemical vapor deposition (CVD) such as high-density plasma CVD (HDP-CVD) and sub-atmospheric CVD (SACVD) or formed by spin-on. In certain embodiments, the devices (such as the transistor 30, the transistor 40, and the transistor 50) and the isolation structures 204 are formed in the substrate 200 during the front-end-of-line (FEOL) processes. In one embodiment, the transistors 30, 40, and 50 are formed following the complementary MOS (CMOS) processes. The number and configurations of the devices formed in the semiconductor substrate 202 should not be limited by the embodiments or drawings of this disclosure. It is understood that the number and configurations of the devices may have different material or configurations depending on product designs.

The transistor 30, the transistor 40, and the transistor 50 may be a PMOS transistor. For example, the transistor 30 includes a gate structure 310 and source/drain regions 320 located at two opposite sides of the gate structure 310, where the gate structure 310 is formed on an n-well region 330, and the source/drain regions 320 are formed in the n-well region 330. In one embodiment, the gate structure 310 includes a gate electrode 312, a gate dielectric layer 314 and a gate spacer 316. The gate dielectric layer 314 may spread between the gate electrode 312 and the semiconductor substrate 202, and may or may not further cover a sidewall of the gate electrode 312. The gate spacer 316 may laterally surround the gate electrode 312 and the gate dielectric layer 314. In one embodiment, the source/drain regions 320 include doped regions of p-type dopant that are formed in the n-well region 330 by ion implantation. In an alternative embodiment, the source/drain regions 320 include epitaxial structures formed in and protruding from a surface of the semiconductor substrate 202, that are formed by epitaxial growth.

For example, the transistor 40 includes a gate structure 410 and source/drain regions 420 located at two opposite sides of the gate structure 410, where the gate structure 410 is formed on an n-well region 430, and the source/drain regions 420 are formed in the n-well region 430. In one embodiment, the gate structure 410 includes a gate electrode 412, a gate dielectric layer 414 and a gate spacer 416. The gate dielectric layer 414 may spread between the gate electrode 412 and the semiconductor substrate 202, and may or may not further cover a sidewall of the gate electrode 412. The gate spacer 416 may laterally surround the gate electrode 412 and the gate dielectric layer 414. In one embodiment, the source/drain regions 420 include doped regions of p-type dopant that are formed in the n-well region 430 by ion implantation. In an alternative embodiment, the source/drain regions 420 include epitaxial structures formed in and protruding from a surface of the semiconductor substrate 202, that are formed by epitaxial growth.

For example, the transistor 50 includes a gate structure 510 and source/drain regions 520 located at two opposite sides of the gate structure 510, where the gate structure 510 is formed on an n-well region 530, and the source/drain regions 520 are formed in the n-well region 530. In one embodiment, the gate structure 510 includes a gate electrode 512, a gate dielectric layer 514 and a gate spacer 516. The gate dielectric layer 514 may spread between the gate electrode 512 and the semiconductor substrate 202, and may or may not further cover a sidewall of the gate electrode 512. The gate spacer 516 may laterally surround the gate electrode 512 and the gate dielectric layer 514. In one embodiment, the source/drain regions 520 include doped regions of p-type dopant that are formed in the n-well region 530 by ion implantation. In an alternative embodiment, the source/drain regions 520 include epitaxial structures formed in and protruding from a surface of the semiconductor substrate 202, that are formed by epitaxial growth.

Alternatively, the transistor 30, the transistor 40, and the transistor 50 may be a NMOS transistor. For example, the transistor 30 includes a gate structure 310 and source/drain regions 320 located at two opposite sides of the gate structure 310, where the gate structure 310 is formed on an p-well region 330, and the source/drain regions 320 are formed in the p-well region 330. In one embodiment, the gate structure 310 includes a gate electrode 312, a gate dielectric layer 314 and a gate spacer 316. The gate dielectric layer 314 may spread between the gate electrode 312 and the semiconductor substrate 202, and may or may not further cover a sidewall of the gate electrode 312. The gate spacer 316 may laterally surround the gate electrode 312 and the gate dielectric layer 314. In one embodiment, the source/drain regions 320 include doped regions of n-type dopant that are formed in the p-well region 330 by ion implantation. In an alternative embodiment, the source/drain regions 320 include epitaxial structures formed in and protruding from a surface of the semiconductor substrate 202, that are formed by epitaxial growth.

For example, the transistor 40 includes a gate structure 410 and source/drain regions 420 located at two opposite sides of the gate structure 410, where the gate structure 410 is formed on an p-well region 430, and the source/drain regions 420 are formed in the p-well region 430. In one embodiment, the gate structure 410 includes a gate electrode 412, a gate dielectric layer 414 and a gate spacer 416. The gate dielectric layer 414 may spread between the gate electrode 412 and the semiconductor substrate 202, and may or may not further cover a sidewall of the gate electrode 412. The gate spacer 416 may laterally surround the gate electrode 412 and the gate dielectric layer 414. In one embodiment, the source/drain regions 420 include doped regions of n-type dopant that are formed in the p-well region 430 by ion implantation. In an alternative embodiment, the source/drain regions 420 include epitaxial structures formed in and protruding from a surface of the semiconductor substrate 202, that are formed by epitaxial growth.

For example, the transistor 50 includes a gate structure 510 and source/drain regions 520 located at two opposite sides of the gate structure 510, where the gate structure 510 is formed on an p-well region 530, and the source/drain regions 520 are formed in the p-well region 530. In one embodiment, the gate structure 510 includes a gate electrode 512, a gate dielectric layer 514 and a gate spacer 516. The gate dielectric layer 514 may spread between the gate electrode 512 and the semiconductor substrate 202, and may or may not further cover a sidewall of the gate electrode 512. The gate spacer 516 may laterally surround the gate electrode 512 and the gate dielectric layer 514. In one embodiment, the source/drain regions 520 include doped regions of n-type dopant that are formed in the p-well region 530 by ion implantation. In an alternative embodiment, the source/drain regions 520 include epitaxial structures formed in and protruding from a surface of the semiconductor substrate 202, that are formed by epitaxial growth.

In further alternative embodiments, one of the transistors 30, 40, and 50 may be the different type than the rest of the transistors 30, 40, and 50. The disclosure is not limited thereto. For example, the transistor 30 and the transistor 40 are PMOS transistors, and the transistor 50 is a NMOS transistor; or vice versa. OR, the transistor 40 and the transistor are PMOS transistors, and the transistor 30 is a NMOS transistor; or vice versa. OR, the transistor 30 and the transistor 50 are PMOS transistors, and the transistor 40 is a NMOS transistor; or vice versa.

As illustrated in FIG. 1, for example, the substrate 200 further includes a dielectric layer 206 stacked on the semiconductor substrate 202 and a plurality of contact plugs 208 penetrating through the dielectric layer 206 to electrically connect to the transistors 30, 40, and 50. In certain embodiments, the dielectric layer 206 and the contact plugs 208 are also formed in the structure 200 during the FEOL processes. The dielectric layer 206 may laterally surround the gate structures 310, 410, 510 and cover the source/drain regions 320, 420, 520 for providing protections to the devices formed in/on the semiconductor substrate 202. Some of the contact plugs 208 may penetrate through the dielectric layer 206 in order to establish electrical connection with the source/drain regions 320, 420 and 520, while others of the contact plugs 208 (not shown) may penetrate through the dielectric layer 206 to establish electrical connection with the gate electrodes (e.g. the gate electrodes 312, 412, 512) of the gate structures 310, 410 and 510, in order to provide terminals for electrical connections to later-formed components (e.g. an interconnect or interconnect structure) or external components.

The dielectric layer 206 may be referred to as an interlayer dielectric (ILD) layer, while the contact plugs 208 may be referred to as metal contacts or metallic contacts. For example, the contact plugs 208 electrically connected to the source/drain regions 320, 420, 520 are referred to as source/drain contacts, and the contact plugs 208 electrically connected to the gate electrodes 312, 412, 512 are referred to as gate contacts. In some embodiments, the contact plugs 208 may include copper (Cu), copper alloys, nickel (Ni), aluminum (Al), manganese (Mn), magnesium (Mg), silver (Ag), gold (Au), tungsten (W), a combination of thereof, or the like. The contact plugs 208 may be formed by, for example, plating such as electroplating or electroless plating, CVD such as plasma enhanced CVD (PECVD), atomic layer deposition (ALD), and physical vapor deposition (PVD), a combination thereof, or the like. Throughout the description, the term "copper" is intended to include substantially pure elemental copper, copper containing unavoidable impurities, and copper alloys containing minor amounts of elements such as tantalum, indium, tin, zinc, manganese, chromium, titanium, germanium, strontium, platinum, magnesium, aluminum or zirconium, etc.

In some embodiments, the dielectric layer 206 includes silicon oxide, silicon nitride, silicon carbide, silicon oxynitride, silicon carbonitride, silicon carbide oxynitride, spin-on glass (SOG), phosphosilicate glass (PSG), borosilicate glass (BSG), borophosphosilicate glass (BPSG), fluorinated silica glass (FSG), carbon doped silicon oxide (e.g., SiCOH), polyimide, and/or a combination thereof. In alternative embodiments, the dielectric layer 206 include low-k dielectric materials. For example, the low-k dielectric material generally has a dielectric constant lower than 3.9. Examples of low-k dielectric materials may include BLACK DIAMOND® (Applied Materials of Santa Clara, Calif.), Xerogel, Aerogel, amorphous fluorinated carbon, Parylene, BCB, Flare, SILK® (Dow Chemical, Midland, Mich.), hydrogen silsesquioxane (HSQ) or fluorinated silicon oxide (SiOF), and/or a combination thereof. It is understood that the dielectric layer 206 may include one or more dielectric materials. For example, the dielectric layer 206 include a single-layer structure or a multilayer structure. In some embodiments, the dielectric layer 206 is formed to a suitable thickness by CVD such as flowable chemical vapor deposition (FCVD), HDP-CVD, and SACVD, spin-on, sputtering, or other suitable methods.

A seed layer (not shown) may be optionally formed between the dielectric layer 206 and the contact plugs 208. That is, for example, the seed layer covers a bottom surface and sidewalls of each of the contact plugs 208. In some embodiments, the seed layer is a metal layer, which may be a single layer or a composite layer comprising a plurality of sub-layers formed of different materials. In some embodiments, the contact plugs 208 includes copper layer and the seed layer includes a titanium layer and a copper layer over the titanium layer. The seed layer is formed using, for example, PVD or the like. In one embodiment, the seed layer may be omitted.

In addition, an additional barrier layer or adhesive layer (not shown) may be optionally formed between the contact plugs 208 and the dielectric layer 206. Owing to the additional barrier layer or adhesive layer, it is able to prevent the seed layer and/or the contact plugs 208 from diffusing to the underlying layers and/or the surrounding layers. The additional barrier layer or adhesive layer may include Ti, TiN, Ta, TaN, a combination thereof, a multilayer thereof, or the like, and may be formed using CVD, ALD, PVD, a combination thereof, or the like. In an alternative embodiment of which the seed layer is included, the additional barrier layer or adhesive layer is interposed between the dielectric layer 206 and the seed layer, and the seed layer is interposed between the contact plugs 208 and the additional barrier layer or adhesive layer. In one embodiment, the additional barrier layer or adhesive layer may be omitted.

In some embodiments, the stacked structure is formed on the substrate 200. For example, as show in FIG. 1, the stacked structure includes a plurality of build-up layers L1, L2, L3, and L4 of an interconnect 100 (depicted in FIG. 6) stacked thereon. In some embodiments, the build-up layer L1 is disposed on (e.g., in physical contact with) and electrically coupled to the devices such as the transistors 30, 40, and 50 through the contact plugs 208 for providing routing function thereto. In the case, the build-up layer L2 is disposed on (e.g., in physical contact with) and electrically connected to the build-up layer L1, and thus is electrically coupled to the devices such as the transistors 30, 40, and 50 through the contact plugs 208 and the build-up layer L1 for providing routing function thereto. The build-up layer L3 is disposed on (e.g., in physical contact with) and electrically connected to the build-up layer L2, and thus is electrically coupled to the devices such as the transistors 30, 40, and 50 through the contact plugs 208 and the build-up layers L1-L2 for providing routing function thereto. The build-up layer L4 is disposed on (e.g., in physical contact with) and electrically connected to the build-up layer L3, and thus is electrically coupled to the devices such as the transistors 30, 40, and 50 through the contact plugs 208 and the build-up layers L1-L3 for providing routing function thereto.

For example, as shown in FIG. 1, the build-up layer L1 is sandwiched between the semiconductor substrate 202 and the build-up layer L2, the build-up layer L2 is sandwiched between the build-up layer L1 and the build-up layer L3, and the build-up layer L3 is sandwiched between the build-up layer L2 and the build-up layer L4. The build-up layers L1 through L4 are electrically coupled to each other. The build-up layers L1-L4 may be referred to as a first build-up layer L1, a second build-up layer L2, a third build-up layer L3, and a fourth build-up layer L4, respectively. Only four build-up layers (e.g., L1-L4) of the stacked structure are shown in FIG. 1 for illustrative purposes, however the disclosure is not limited thereto. The number of the build-up layers of the stacked structure may be one or more than one, depending on the depending on the demand and design requirements.

The formation of the build-up layer L1 of the stacked structure may include, but not limited to, forming a blanket layer of a first dielectric material (not shown) over the substrate 200 to cover up the devices such as the transistors 30, 40, and 50; forming a blanket layer of a second dielectric material (not shown) over the first dielectric material blanket layer so to sandwich the first dielectric material blanket layer between the second dielectric material blanket layer and the substrate 200; patterning the first dielectric material blanket layer and the second dielectric material blanket layer to form a first dielectric layer 110a and a second dielectric layer 120a disposed thereon, where a plurality of openings OP1 penetrate through the first dielectric layer 110a and the second dielectric layer 120a; forming a seed layer 130a in the openings OP1; and forming a conductive material in the opening OP1 to form a conductive layer 140a over the seed layer 130a so to form a metallization layer ML1 in the openings OP1, thereby forming the build-up layer L1. For example, as shown in FIG. 1, the metallization layer ML1 of the build-up layer L1 includes the seed layer 130a and the conductive layer 140a standing thereon and electrically connected thereto, and is embedded in a dielectric structure DL1 of the build-up layer L1, where the dielectric structure DL1 includes the first dielectric layer 110a and the second dielectric layer 120a stacked thereon. As shown in FIG. 1, for example, the conductive layer 140a is electrically connected to the transistors 30, 40, and 50 through the seed layer 130a and the conductive plugs 208.

In some embodiments, the first dielectric layer 110a and the second dielectric layer 120a have different materials. For example, the first dielectric layer 110a includes a silicon carbide (SiC) layer, a silicon nitride ($Si_3N_4$) layer, an aluminum oxide layer, or the like. For example, the second dielectric layer 120a includes a silicon-rich oxide (SRO) layer. In some embodiments, the second dielectric layer 120a is referred to as an inter-metal dielectric (IMD) layer which may be made of a dielectric material, such as silicon oxide, silicon nitride, silicon oxynitride, a spin-on dielectric material, or a low-k dielectric material. It should be noted that the low-k dielectric materials are generally dielectric materials having a dielectric constant lower than 3.9. In some alternative embodiments, the first dielectric layer 110a and the second dielectric layer 120a have different etching selectivities. In the case, the first dielectric layer 110a may be referred to as an etching stop layer to prevent the underlying elements (e.g., the contact plugs 208 and the dielectric layer 206) from damage caused by the over-etching.

In some embodiments, the first dielectric material blanket layer and the second dielectric material blanket layer are patterned through a set(s) of photolithography and etching processes. The etching process may include a dry etching, a wet etching, or a combination thereof. After the etching process, a cleaning step may be optionally performed, for example to clean and remove the residue generated from the etching process. However, the disclosure is not limited thereto, and the etching process may be performed through any other suitable method. The openings OP1 each may include a trench hole OT1 and a via hole OV1 underlying and spatially communicated to the trench hole OT1. For example, the trench holes OT1 are formed in the second dielectric layer 120a and extend from an illustrated top surface of the second dielectric layer 120a to a position inside the second dielectric layer 120a. For example, the via holes OV1 are formed in the second dielectric layer 120a and the first dielectric layer 110a and extend from the position inside the second dielectric layer 120a to an illustrated bottom surface of the first dielectric layer 110a. The position may be about ½ to about ⅓ of a thickness of the second dielectric layer 120a; however, the disclosure is not limited thereto. In some embodiments, the openings OP1 includes a dual damascene structure. The formation of the openings OP1 is not limited to the disclosure. The formation of opening OP1 (with the dual damascene structure) can be formed by any suitable forming process, such as a via first approach or a trench first approach.

As shown in FIG. 1, a lateral size of the trench holes OT1 may be greater than a lateral size of the via holes OV1. In some embodiments, a sidewall of each of the via holes OV1 is a slant sidewall. In alternative embodiments, the sidewall of each of the via holes OV1 is a vertical sidewall. In some embodiments, a sidewall of each of the trench holes OT1 is a vertical sidewall. In alternative embodiments, the sidewall S2 of each of the trench holes OT1 is a slant sidewall. The sidewall of one via hole OV1 and the sidewall of a respective one trench hole OT1 may be collectively referred to as a sidewall of one opening OP1. For illustrative purposes, the number of the openings OP1 shown in FIG. 1 does not limit the disclosure, and may be designated and selected based on the demand and layout design. As illustrated in FIG. 1, portions of the metallization layer ML1 formed in the trench holes OT1 may be referred to as conductive traces or conductive wires T1 horizontally extended (e.g., extending in a direction X and/or a direction Y), and portions of the metallization layer ML1 formed in the via holes OV1 may be referred to as conductive vias V1 vertically extended (e.g., extending in a direction Z). The directions X, Y and Z may be different from each other. For example, as shown in FIG. 1, directions X, Y and Z are substantially perpendicular to each other. The direction Z may be referred to as a stacking direction Z of the build-up layers L1-L4 and the substrate 200.

In some embodiment, the seed layer 130a and the conductive layer 140a are sequentially formed in the openings OP1 by, but not limited to, conformally forming a blanket layer made of metal or metal alloy materials over the dielectric structure DL1 and extending into the openings OP1, so to line the sidewalls of the openings OP1; filling the conductive material in the openings OP1; and removing excess amount of the blanket layer made of metal or metal alloy materials and the conductive material over the illustrated top surface of the second dielectric layer 120a, thereby the metallization layer ML1 including the seed layer 130a and the conductive layer 140a is manufactured. The removal may be performed by a planarizing process such as a mechanical grinding, a chemical mechanical polishing (CMP), and/or an etching process. After the planarizing process, a cleaning process may be optionally performed, for example to clean and remove the residue generated from the planarizing process. However, the disclosure is not limited thereto, and the planarizing process may be performed through any other suitable method.

In some embodiments, the seed layer 130a is referred to as a metal layer, which can be a single layer or a composite layer including a plurality of sub-layers formed of different materials. In some embodiments, the seed layer 130a includes titanium, copper, molybdenum, tungsten, titanium nitride, titanium tungsten, combinations thereof, or the like. For example, the seed layer 130a may include a titanium layer and a copper layer over the titanium layer. The seed layer 130a may be formed using, for example, sputtering, PVD, or the like. The seed layer 130a may have a thickness (as measured in the direction Z) of about 1 nm to about 50 nm, although other suitable thickness may alternatively be utilized.

In some embodiments, a material of the conductive material includes a suitable conductive material, such as metal and/or metal alloy. For example, the conductive material can be Al, aluminum alloys, Cu, copper alloys, or combinations thereof (e.g., AlCu), the like, or combinations thereof. In some embodiments, the conductive material is formed by plating process or any other suitable method, which the plating process may include electroplating or electroless plating, or the like. In alternative embodiments, the conductive material may be formed by deposition. The disclosure is not limited thereto. In the case, an illustrated top surface of the metallization layer ML1 is substantially level with an illustrated top surface of the dielectric structure DL1. That is, the illustrated top surface of the metallization layer ML1 is substantially coplanar to the illustrated top surface of the dielectric structure DL1.

The formation, material, and configuration of components of each of the build-up layer L2, the build-up layer L3, and the build-up layer L4 are similar to or substantially identical to the forming process, material, and configuration of the components of the build-up layer L1 as aforementioned above, and thus are not repeated herein for brevity.

Continued on FIG. 1, for example, the build-up layer L2 includes a dielectric structure DL2 and a metallization layer ML2 disposed therein. The dielectric structure DL2 may include a first dielectric layer 110b and a second dielectric layer 120b disposed thereon, where the dielectric structure DL2 may be penetrated by a plurality of opening OP2. In the case, the metallization layer ML2 is disposed inside the openings OP2, where the metallization layer ML2 includes a seed layer 130b and a conductive layer 140b disposed thereon, the seed layer 130b lines sidewalls of the openings OP2, and the conductive layer 140b directly stacked on the seed layer 130b. The conductive layer 140b of the metallization layer ML2 is electrically coupled to the conductive layer 140a of the metallization layer ML1 through the seed layer 130b, for example, as shown in FIG. 1. The openings OP2 each may include a trench hole OT2 and a via hole OV2 underlying and spatially communicated to the trench hole OT2. For example, the trench holes OT2 are formed in the second dielectric layer 120b and extend from an illustrated top surface of the second dielectric layer 120b to a position inside the second dielectric layer 120b. For example, the via holes OV2 are formed in the second dielectric layer 120b and the first dielectric layer 110b and extend from the position inside the second dielectric layer 120b to an illustrated bottom surface of the first dielectric layer 110b. The position may be about ½ to about ⅓ of a thickness of the second dielectric layer 120b; however, the disclosure is not limited thereto. As illustrated in FIG. 1, portions of the metallization layer ML2 formed in the trench holes OT2 may be referred to as conductive traces or conductive wires T2 horizontally extended (e.g., extending in the direction X and/or the direction Y), and portions of the metallization layer ML2 formed in the via holes OV2 may be referred to as conductive vias V2 vertically extended (e.g., extending in the direction Z). In the case, an illustrated top surface of the metallization layer ML2 is substantially level with an illustrated top surface of the dielectric structure DL2. That is, the illustrated top surface of the metallization layer ML2 is substantially coplanar to the illustrated top surface of the dielectric structure DL2.

In some embodiments, the build-up layer L3 includes a dielectric structure DL3 and a metallization layer ML3 disposed therein. The dielectric structure DL3 may include a first dielectric layer 110c and a second dielectric layer 120c disposed thereon, where the dielectric structure DL3 may be penetrated by a plurality of opening OP3. In the case, the metallization layer ML3 is disposed inside the openings OP3, where the metallization layer ML3 includes a seed layer 130c and a conductive layer 140c disposed thereon, the seed layer 130c lines sidewalls of the openings OP3, and the conductive layer 140c directly stacked on the seed layer 130c. The conductive layer 140c of the metallization layer ML3 is electrically coupled to the conductive layer 140b of the metallization layer ML2 through the seed layer 130c, for example, as shown in FIG. 1. The openings OP3 each may include a trench hole OT3 and a via hole OV3 underlying and spatially communicated to the trench hole OT3. For example, the trench holes OT3 are formed in the second dielectric layer 120c and extend from an illustrated top surface of the second dielectric layer 120c to a position inside the second dielectric layer 120c. For example, the via holes OV3 are formed in the second dielectric layer 120c and the first dielectric layer 110c and extend from the position inside the second dielectric layer 120c to an illustrated bottom surface of the first dielectric layer 110c. The position may be about ½ to about ⅓ of a thickness of the second dielectric layer 120c; however, the disclosure is not limited thereto. As illustrated in FIG. 1, portions of the metallization layer ML3 formed in the trench holes OT3 may be referred to as conductive traces or conductive wires T3 horizontally extended (e.g., extending in the direction X and/or the direction Y), and portions of the metallization layer ML3 formed in the via holes OV3 may be referred to as conductive vias V3 vertically extended (e.g., extending in the direction Z). In the case, an illustrated top surface of the metallization layer ML3 is substantially level with an illustrated top surface of the dielectric structure DL3. That is, the illustrated top surface of the metallization layer ML3 is substantially coplanar to the illustrated top surface of the dielectric structure DL3.

In some embodiments, the build-up layer L4 includes a dielectric structure DL4 and a metallization layer ML4 disposed therein. The dielectric structure DL4 may include a first dielectric layer 110d and a second dielectric layer 120d disposed thereon, where the dielectric structure DL4 may be penetrated by a plurality of opening OP4. In the case, the metallization layer ML4 is disposed inside the openings OP4, where the metallization layer ML4 includes a seed layer 130d and a conductive layer 140d disposed thereon, the seed layer 130d lines sidewalls of the openings OP4, and the conductive layer 140d directly stacked on the seed layer 130d. The conductive layer 140d of the metallization layer ML4 is electrically coupled to the conductive layer 140c of the metallization layer ML3 through the seed layer 130d, for example, as shown in FIG. 1. The openings OP4 each may include a trench hole OT4 and a via hole OV4 underlying and spatially communicated to the trench hole OT4. For example, the trench holes OT4 are formed in the second dielectric layer 120d and extend from an illustrated top surface of the second dielectric layer 120d to a position inside the second dielectric layer 120d. For example, the via holes OV4 are formed in the second dielectric layer 120d and the first dielectric layer 110d and extend from the position inside the second dielectric layer 120d to an illustrated bottom surface of the first dielectric layer 110d. The position may be about ½ to about ⅓ of a thickness of the second dielectric layer 120d; however, the disclosure is not limited thereto. As illustrated in FIG. 1, portions of the metallization layer ML4 formed in the trench holes OT4 may be referred to as conductive traces or conductive wires T4 horizontally extended (e.g., extending in the direction X and/or the direction Y), and portions of the metallization layer ML4 formed in the via holes OV4 may be referred to as conductive vias V4 vertically extended (e.g., extending in the direction Z). In the case, an illustrated top surface of the metallization layer ML4 is substantially level with an illustrated top surface of the dielectric structure DL4. That is, the illustrated top surface of the metallization layer ML4 is substantially coplanar to the illustrated top surface of the dielectric structure DL4. In addition, the build-up layers L1, L2, L3, and L4 may be referred to as redistribution layers or routing layers of the interconnect 100 (in FIG. 6).

Figure 2:
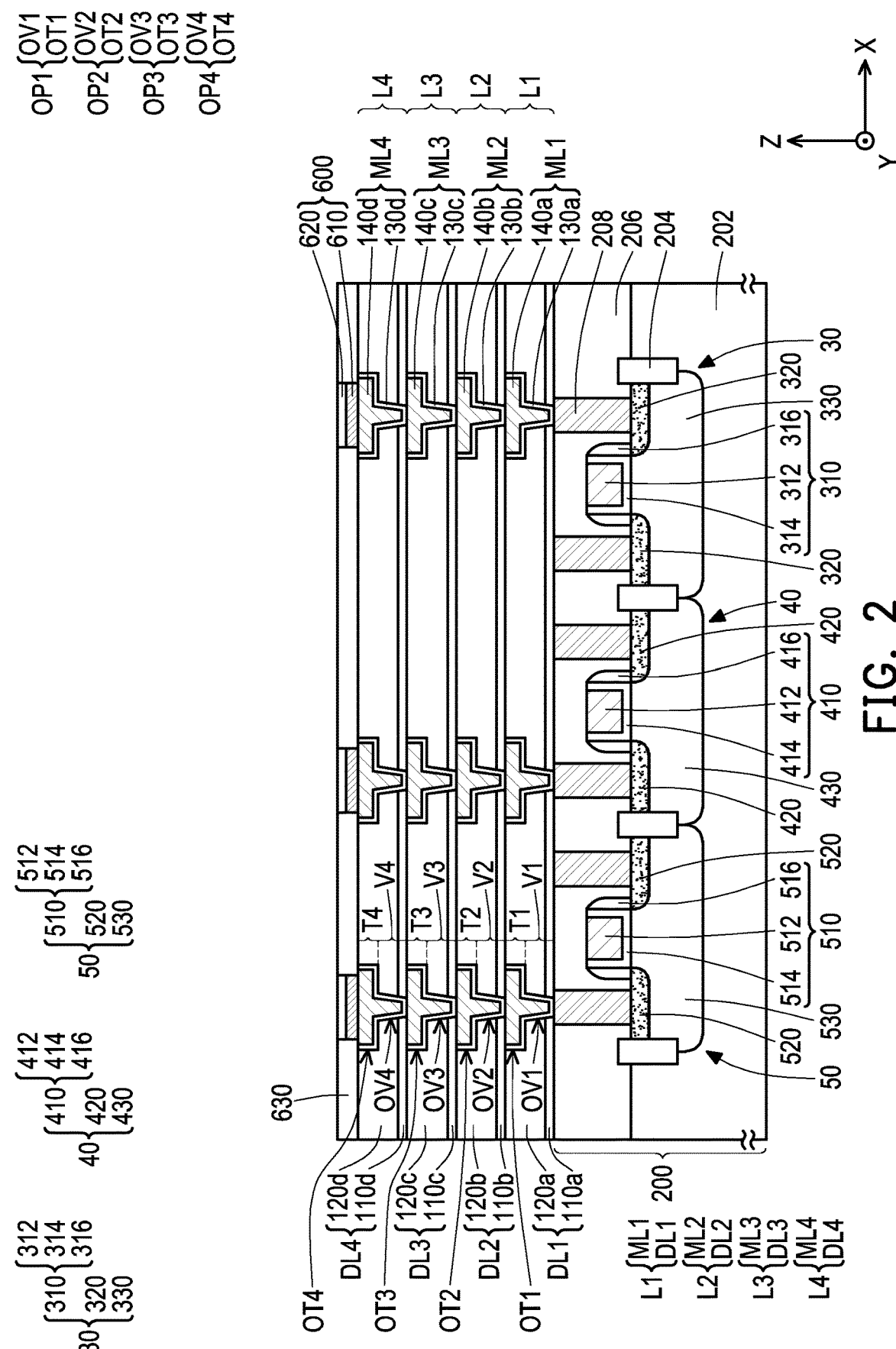

Referring to FIG. 2, in some embodiments, at least one gate structure 600 is formed on the build-up layer L4. For example, as shown in FIG. 2, the at least one gate structure 600 includes a plurality of gate structures 600. Each gate structure 600 may include a gate electrode 610 and a gate dielectric pattern 620 stacked thereon. For example, the gate electrodes 610 are disposed on (e.g., in physical contact with) and electrically connected to the metallization layer ML4 of the build-up layer L4 through the conductive layer 140d, where the gate electrodes 610 are disposed between the gate dielectric patterns 620 and the build-up layer L4. In some embodiments, the gate structures 600 are electrically connected to the devices (e.g., the transistors 30, 40, and 50) formed in the substrate 200, respectively. In other words, each of the gate structures 600 is electrically communicated to a respective one of the devices (e.g., the transistors 30, 40, and 50) formed in the substrate 200.

In some embodiments, the gate electrodes 610 are disposed on the conductive layer 140d of the build-up layer L4, as shown in FIG. 2. In some embodiments, the gate electrodes 610 may include a single layer or multi-layered structure. In one embodiment, the gate electrodes 610 may be a poly gate consisting of a silicon-containing material, such as poly-silicon, amorphous silicon or a combination thereof. In an alternative embodiment, the gate electrodes 610 may be a metal gate, a metal oxide gate, a metal nitride gate, the disclosure is not limited thereto. The metal gate, the metal oxide gate, the metal nitride gate may include a metal, such as Ti, Ta, W, Mo, Ni, Co, Ru, Au, Ag, Pt, Mn, Cu, Al, TiN, TiAl, TiAlN, TaN, NiSi, CoSi, other conductive materials with a work function compatible with the substrate material, or combinations thereof. For example, the gate electrodes 610 are made of TiN. In some embodiments, the gate electrodes 610 include a thickness (as measured in the direction Z) approximately in the range of 5 nm to 100 nm, although other suitable thickness may alternatively be utilized. The gate electrodes 610 may be formed using a suitable process such as ALD, CVD, PVD, plating, or combinations thereof. The disclosure is not limited thereto.

In some embodiments, as shown in FIG. 2, the gate dielectric patterns 620 are then disposed on the gate electrodes 610. The gate dielectric patterns 620 may include silicon oxide, silicon nitride, silicon oxy-nitride, or high-k dielectric materials. In some embodiments, the high-k dielectric materials include metal oxides, metal nitrides, or metal carbides. Examples of metal oxides, metal nitrides, or metal carbides used for high-k dielectric materials include oxides, nitrides, and/or carbides of Li, Ta, Ti, Be, Mg, Ca, Sr, Sc, Y, Zr, Hf, Al, La, Ce, Pr, Nd, Sm, Eu, Gd, Tb, Dy, Ho, Er, Tm, Yb, Lu, and/or mixtures thereof. For example, the gate dielectric patterns 620 are made of HfO. In some embodiments, the gate dielectric patterns 620 include a thickness (as measured in the direction Z) approximately in the range of 1 nm to 50 nm, although other suitable thickness may alternatively be utilized. The gate dielectric patterns 620 may be formed using a suitable process such as ALD, CVD, PVD, thermal oxidation, UV-ozone oxidation, or combinations thereof. The disclosure is not limited thereto.

The gate electrodes 610 and the gate dielectric patterns 620 may be formed by, but not limited to, the following steps, conformally forming a blanket layer of a conductive material to cover the structure depicted in FIG. 1; conformally forming a blanket layer of a dielectric material to cover the conductive material blanket layer; and patterning the dielectric material blanket layer and the conductive material blanket layer to form multiple gate dielectric patterns 620 and multiple gate electrodes 610 respectively disposed underneath thereto. The gate dielectric patterns 620 may be formed by deposition and etching processes. The conductive material blanket layer is patterned through etching process by using the gate dielectric patterns 620 as the etching mask to form the gate electrodes 610. The etching process may include a dry etching, a wet etching, or a combination thereof. The disclosure is not limited thereto. In one embodiment, in a plane view (e.g., X-Y plane), one gate dielectric pattern 620 has a contour similar to or substantially identical to a contour of the respective one gate electrode 610 disposed underneath thereto. For example, as shown in FIG. 2, a sidewall of the gate dielectric pattern 620 is aligned with a sidewall of the respective one gate electrode 610. In the case, the sidewall of the gate dielectric pattern 620 and the sidewall of the respective one gate electrode 610 together constitute a sidewall of a respective one gate structure 600.

Continued on FIG. 2, in some embodiments, a dielectric layer 630 is formed over the substrate 200 to laterally cover the gate structures 600. For example, the sidewalls of the gate structures 600 are covered by (e.g., in physical contact with) the dielectric layer 630. The dielectric layer 630 may be formed by, but not limited to, forming a blanket layer of dielectric material over the gate structures 600 and the build-up layer L4 exposed therefrom, so that the gate structure 600 and the build-up layer L4 are not accessibly revealed by the dielectric material blanket layer; and planarizing the dielectric material blanket layer to form the dielectric layer 630 exposing the gate structure 600. For example, an illustrated top surface of the dielectric layer 630 is substantially level with illustrated top surfaces of the gate structures 600. That is, the illustrated top surface of the dielectric layer 630 is substantially coplanar to the illustrated top surfaces of the gate structures 600.

In some embodiments, the material of the dielectric layers 630 may be polyimide, polybenzoxazole (PBO), BCB, PSG, BSG, BPSG, a combination thereof, or the like. In alternative embodiments, the dielectric layer 630 is referred to as an IMD layer which includes a dielectric material, such as a nitride such as silicon nitride, an oxide such as silicon oxide, silicon oxynitride, a spin-on dielectric material, or a low-k dielectric material. It should be noted that the low-k dielectric materials are generally dielectric materials having a dielectric constant lower than 3.9. In some embodiments, the dielectric layer 630 may be formed by suitable fabrication techniques such as spin-on coating, CVD (e.g., PECVD), or the like. The dielectric layer 630 may be planarized by mechanical grinding, CMP, etching, or a combination thereof. After the planarizing step, a cleaning step may be optionally performed, for example to clean and remove the residue generated from the planarizing step. However, the disclosure is not limited thereto, and the planarizing step may be performed through any other suitable method. In one embodiment, the material of the dielectric layer 630 may be the same as the material of the second dielectric layer 120a, 120b, 120c, and/or 120d. Alternatively, the material of the dielectric layer 630 may be different from the material of the second dielectric layer 120a, 120b, 120c, and/or 120d.

Figure 3:
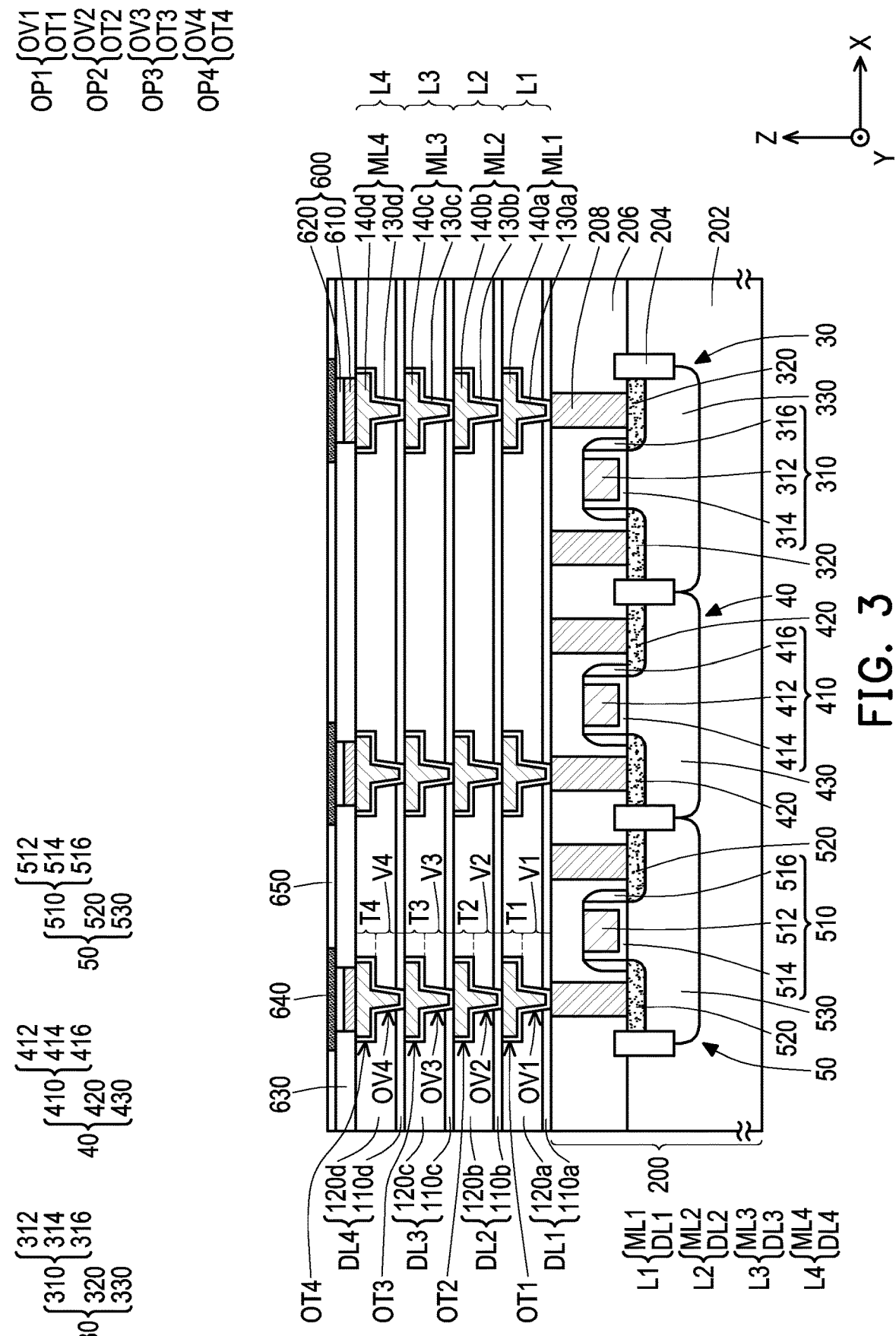

Referring to FIG. 3, in some embodiments, a plurality of semiconductor patterns 640 are formed over the gate structures 600, and a dielectric layer 650 is then formed to laterally cover the semiconductor patterns 640. For example, as shown in FIG. 3, the semiconductor patterns 640 are disposed on the gate dielectric patterns 620, respectively. In that case, the semiconductor patterns 640 are respectively overlapped with the gate electrodes 610 in the direction Z. As shown in FIG. 3, the semiconductor patterns 640 are accessibly revealed by the dielectric layer 650, for example. In some embodiments, illustrated top surface of the semiconductor patterns 640 are substantially level with an illustrated top surface of the dielectric layer 650. In other words, the illustrated top surface of the semiconductor patterns 640 are substantially coplanar to the illustrated top surface of the dielectric layer 650.

The semiconductor patterns 640 may be formed by, but not limited to, forming a blanket layer of semiconductor material over the structure depicted in FIG. 2; and patterning the semiconductor material blanket layer to form multiple semiconductor patterns 640 over the gate structures 600. The patterning may include photolithograph and etching processes. In some embodiments, the semiconductor patterns 640 include a thickness (as measured in the direction Z) approximately in the range of 5 nm to 100 nm, although other suitable thickness may alternatively be utilized. For example, the semiconductor material blanket layer includes a metal oxide, which is formed by CVD or the like. Examples of metal oxides used for semiconductor materials include oxides of In, Ga, Zn, Al, Sn, Ni, and/or mixtures thereof. For example, the semiconductor patterns 640 are made of indium gallium zinc oxide (IGZO). For example, as shown in FIG. 3, a lateral size of one semiconductor pattern 640 is greater than a lateral size of a respective one gate electrode 610. In alternative embodiments, the lateral size of one semiconductor pattern 640 may be substantially equal to the lateral size of a respective one gate electrode 610. In further alternative embodiments, the lateral size of one semiconductor pattern 640 may be less than the lateral size of a respective one gate electrode 610.

The formation and material of the dielectric layer 650 may be similar to or substantially identical to the forming process and material of the dielectric layer 630, and thus are not repeated herein for brevity. For example, sidewalls of the semiconductor patterns 640 are covered by (e.g., in physical contact with) the dielectric layer 650.

Figure 4:
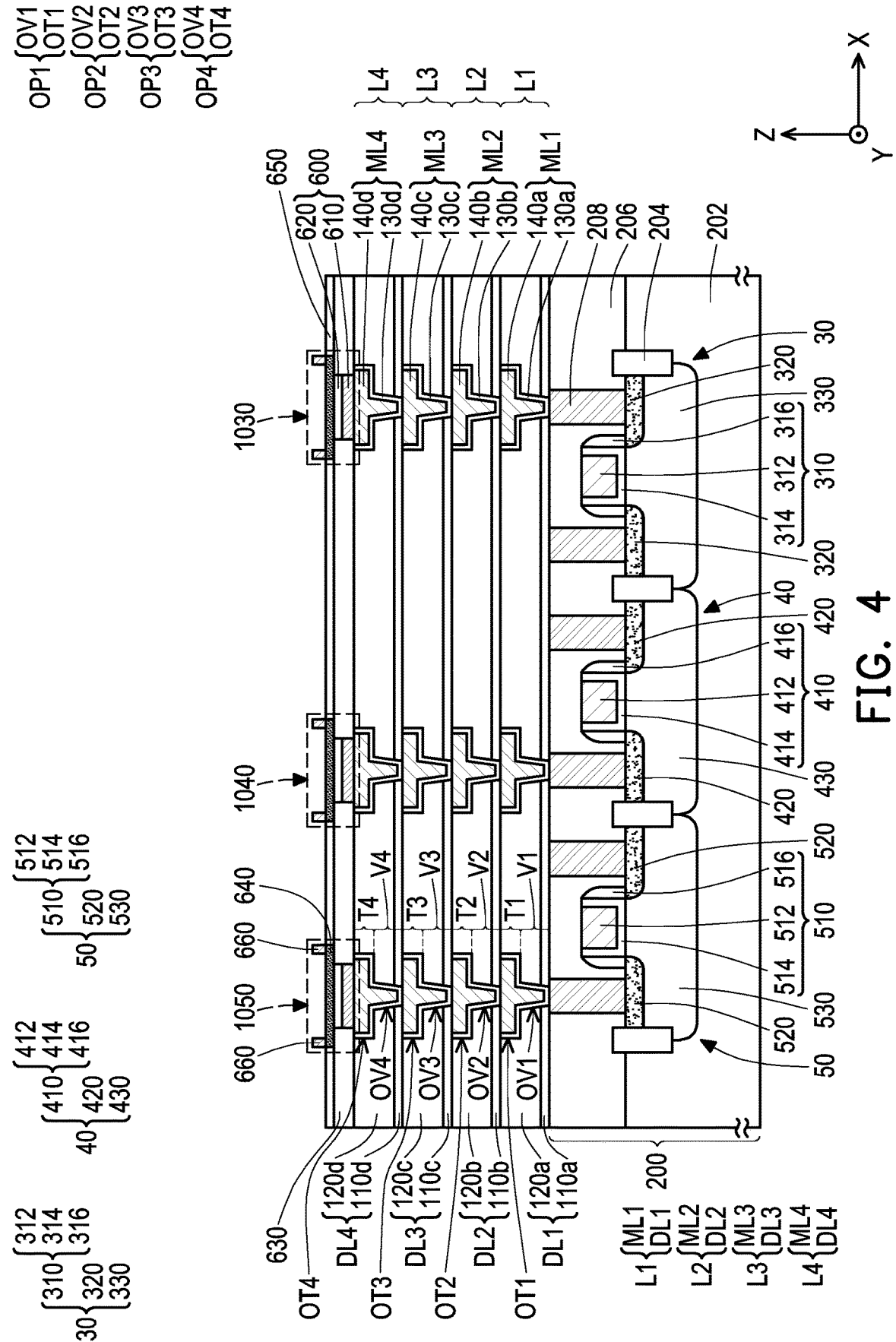

Referring to FIG. 4, in some embodiments, a plurality of source/drain regions 660 are formed over the semiconductor patterns 640. For example, a pair of the source/drain regions 660 are disposed on (e.g., in physical contact with) a respective one semiconductor pattern 640 and at two opposite sides of the respective one gate electrode 610 disposed underneath thereto. The respective one semiconductor pattern 640 is disposed between the pair of the source/drain regions 660 and the respective one gate electrode 610, as shown in FIG. 4. Up to here, the TFTs 1030, 1040, and 1050 are manufactured. In some embodiment, each of the TFTs 1030, 1040, and 1050 includes one gate structure 600 (including one gate electrode 610 and one gate dielectric pattern 620), one semiconductor pattern 640, and one pair of source/drain regions 660, where the TFTs 1030, 1040, and 1050 are separated from one another. In some embodiments, structures and configurations of the TFTs 1030, 1040, and 1050 are substantially identical to each other. However, the disclosure is not limited thereto; in certain embodiments, sizes and/or shapes (in a plane view) of the TFTs 1030, 1040, and 1050 may differ from one another based on the demand and design requirements. Owing to the configurations of the TFTs 1030-1050, their fabrication is able to formed in the interconnect during the BEOL processes, thus the manufacturing process of the semiconductor device 10 is simplified, thereby lowering the manufacturing cost.

The formation of the source/drain regions 660 may include, but not limited to, forming a blanket layer of conductive material over the structure depicted in FIG. 3; and patterning the conductive material blanket layer to form the source/drain regions 600. The material of the source/drain regions 660 may be similar to or substantially identical to the material of the gate electrode 610, and thus is not repeated herein for brevity.

In some embodiments, the gate electrodes 610 of the gate structures 600 each are referred to as a gate of a TFT (e.g., the TFTs 1030, 1040, and 1050), one pair of the source/drain regions 660 standing on the same semiconductor pattern 640 and disposed at two opposite sides of a respective one gate electrode 610 each are referred to as a source/drain element of a TFT (e.g., the TFTs 1030, 1040, and 1050), and a portion of each of the semiconductor patterns 640 sandwiched between one pair of the source/drain regions 660 standing thereon is referred to as a channel or a channel region of a TFT (e.g., the TFTs 1030, 1040, and 1050), where a conduction status of the channel or the channel region is controlled by a voltage applied or induced onto the gate electrode 610. In the case, the conduction status of the channel or the channel region can be detected and/or controlled by the devices (such as the transistor 30, the transistor 40, and the transistor 50) electrically coupled thereto. In some embodiments, the gate dielectric patterns 620 formed in the same process may together be referred to as a gate dielectric layer. In some embodiments, the semiconductor patterns 640 formed in the same process may together be referred to as a semiconductor layer. Owing to the semiconductor patterns 640, the TFTs (e.g., the TFTs 1030, 1040, and 1050) may be considered as low-temperature TFTs, which is able to be formed in the BEOL process. As illustrated in FIG. 4, the gate of the TFT 1030 is electrically coupled to and electrically communicated to the transistor 30 through the build-up layers L1-L4 and at least one of the conductive plugs 208, while the pair of the source/drain element of the TFT 1030 are respectively electrically coupled to and electrically communicated to different transistors embedded in the substrate 200 through the build-up layers L1-L4 and respective ones of conductive plugs 208, in some embodiments. In the case, the gate of the TFT 1040 is electrically coupled to and electrically communicated to the transistor 40 through the build-up layers L1-L4 and at least one of the conductive plugs 208, while the pair of the source/drain element of the TFT 1040 are respectively electrically coupled to and electrically communicated to different transistors embedded in the substrate 200 through the build-up layers L1-L4 and respective ones of conductive plugs 208. And, the gate of the TFT 1050 is electrically coupled to and electrically communicated to the transistor 50 through the build-up layers L1-L4 and at least one of the conductive plugs 208, while the pair of the source/drain element of the TFT 1050 are respectively electrically coupled to and electrically communicated to different transistors embedded in the substrate 200 through the build-up layers L1-L4 and respective ones of conductive plugs 208.

Figure 5:
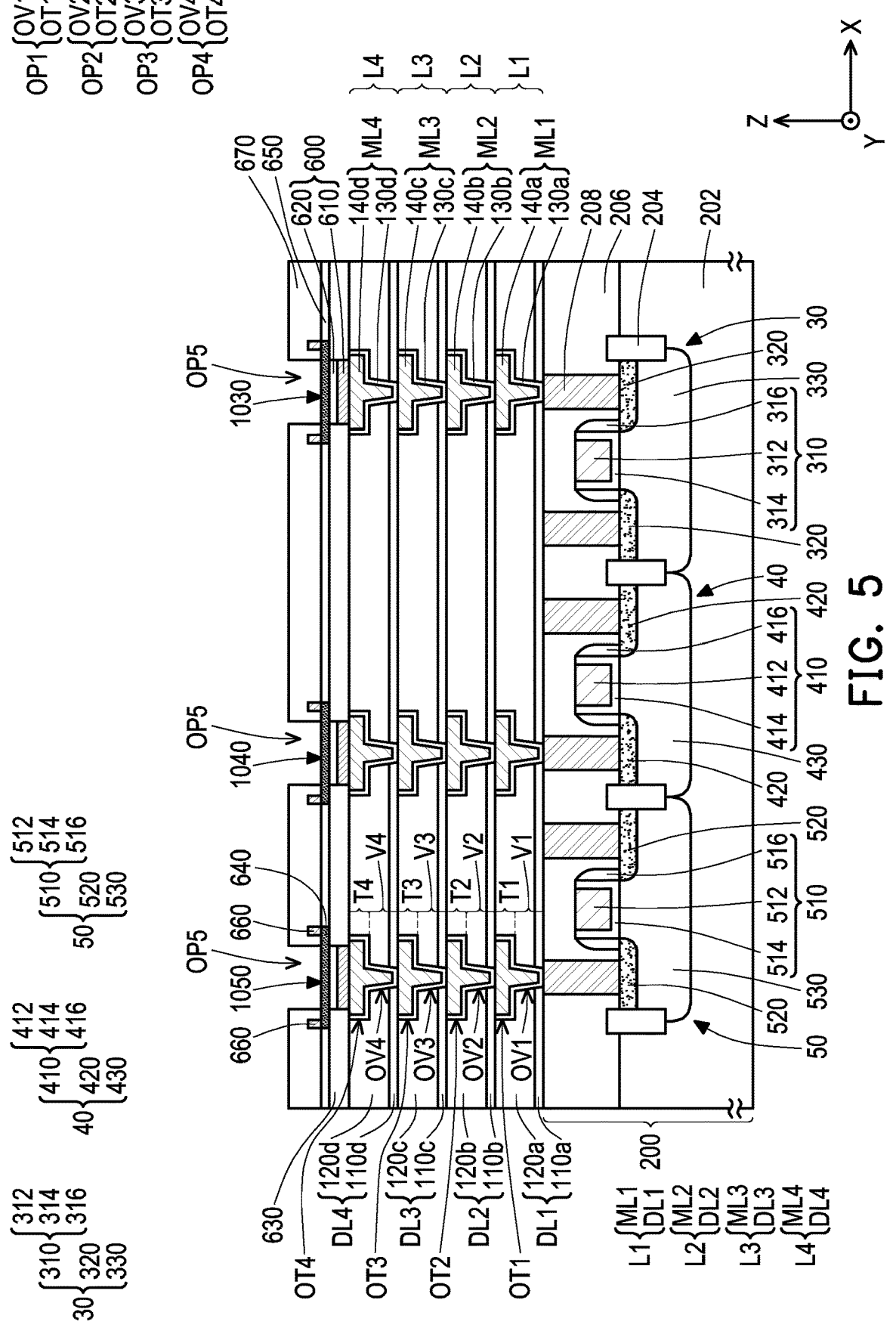

Referring to FIG. 5, in some embodiments, a dielectric layer 670 is formed over the structure depicted in FIG. 4 to embed the source/drain regions 660 therein, and a plurality of openings OP5 are formed in the dielectric layer 670 to accessibly reveal portions of the semiconductor patterns 640. For example, as shown in FIG. 5, each of the openings OP5 is disposed between one pair of the source/drain regions 660 of one transistor such as the transistors 1030, 1040, and/or 1050. The dielectric layer 670 may be referred to as a passivation layer or a protection layer. In some embodiments, each of portions of the dielectric layer 670, which is disposed between two adjacent openings OP5, is referred to as an isolation structure or an isolation well to separate adjacent sensor components (such as 60 depicted in FIG. 6).

The formation of the dielectric layer 670 may include, but not limited to, forming a blanket layer of a dielectric material over the structure depicted in FIG. 4; and patterning the dielectric material blanket layer to form the dielectric layer 670 having the openings OP5 penetrating therethrough. The material of the dielectric layer 670 is or include, for example, silicon oxide, silicon nitride, silicon oxynitride, a spin-on dielectric material, or a low-k dielectric material. For example, the low-k dielectric material generally has a dielectric constant lower than 3.9. The dielectric material may be formed by CVD such as HDP-CVD and SACVD or formed by spin-on. The patterning may include photolithography and etching processes. The etching process includes a dry etching, a wet etching, or a combination thereof, for example. The dielectric layer 670 may have a thickness (as measured in the direction Z) of about 10 nm to about 300 nm, although other suitable thickness may alternatively be utilized.

As illustrated in FIG. 5, a lateral size of the openings OP5 may be substantially equal to a lateral size of the gate electrodes 610. Alternatively, the lateral size of the openings OP5 may be greater than the lateral size of the gate electrodes 610. Or, the lateral size of the openings OP5 may be less than the lateral size of the gate electrodes 610. In some embodiments, the sidewall of each of the openings OP5 is a vertical sidewall, as shown in FIG. 5. However, the disclosure is not limited thereto; alternatively, a sidewall of each of the openings OP5 may a slant sidewall, where the lateral size of the openings OP5 may be gradually decreased from an illustrated top surface of the dielectric layer 670 toward an illustrated bottom surface of the dielectric layer 670. Or alternatively, a sidewall of each of the openings OP5 may a curved (or rounded) sidewall, where the lateral size of the openings OP5 may be gradually decreased from an illustrated top surface of the dielectric layer 670 toward an illustrated bottom surface of the dielectric layer 670. In some embodiments, if considering the plane view (e.g., the X-Y plane), a cross-section of the openings OP5 is in a rectangular shape. However, the disclosure is not limited thereto; alternatively, in the plane view, the cross-section of the openings OP5 may be in a circular shape, an oval shape, an elliptical shape, a hexagonal shape, an octangular shape, any other suitable polygonal shape, or an annulus shape, depending on the demand and design requirements. In addition, the annulus shape may be circular, oval, elliptical, rectangular, hexagonal, octangular, or any other suitable polygonal.

Figure 6:
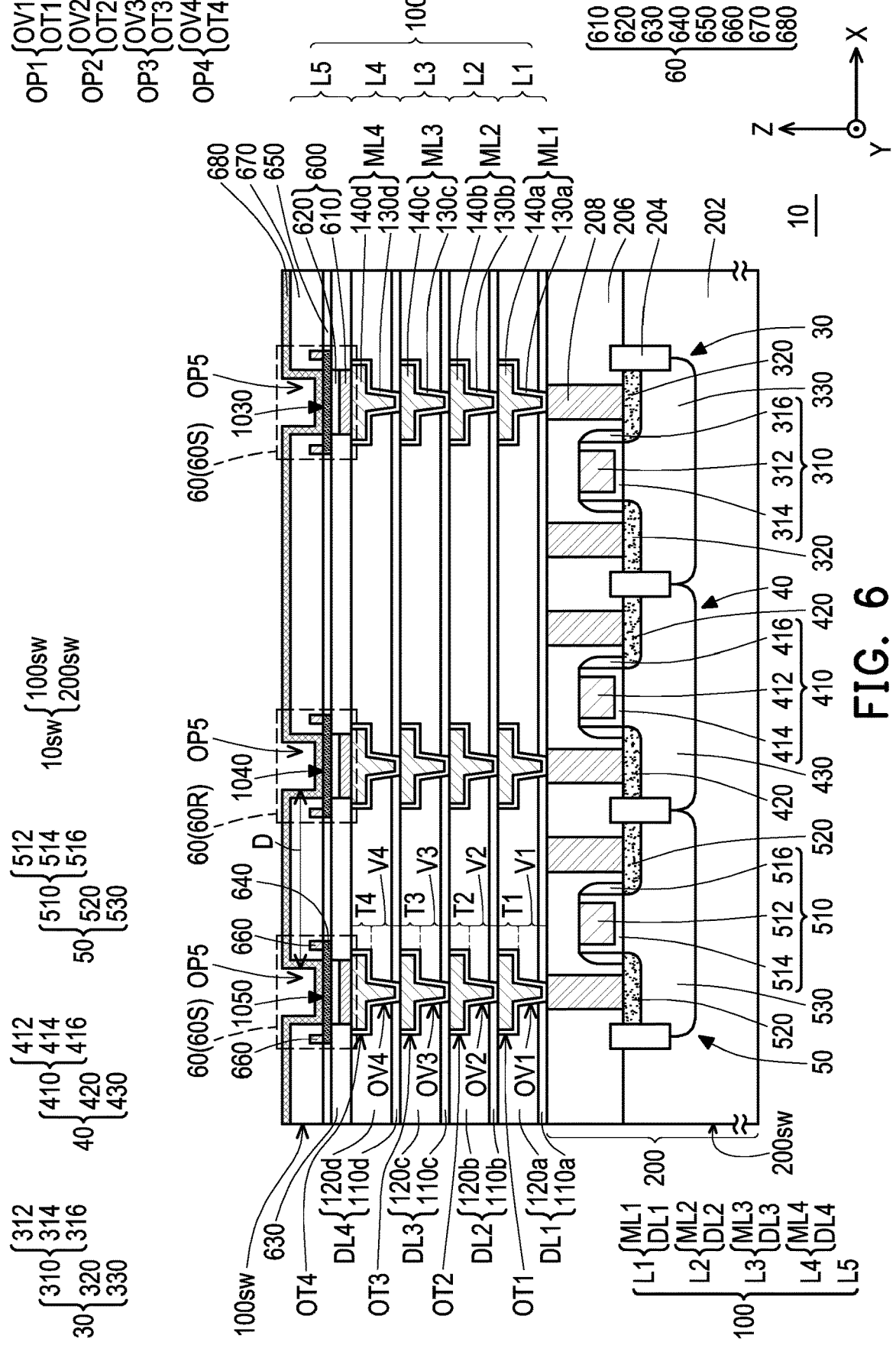

Referring to FIG. 6, in some embodiments, a sensing layer 680 is formed on the dielectric layer 670 and further extends into the openings OP5. For example, the sensing layer 680 is disposed on (e.g., in physical contact with) the dielectric layer 670 and the semiconductor patterns 640 exposed by the openings OP5 formed in the dielectric layer 670. In some embodiments, the sensing layer 680 lines the sidewalls and bottom surfaces of the openings OP5, and directly lies against the illustrated top surfaces of the semiconductor patterns 640. In some embodiments, the sensing layer 680 reacts with or binds directly to a target in a fluid. In alternative embodiments, the sensing layer 680 reacts with or binds indirectly to a target in a fluid through sensing probes (not shown) posited on the sensing layer 680. In some embodiments, the sensing layer 680 is or include hafnium oxide, tantalum oxide, zirconium oxide, some other suitable high-k dielectric(s), or any combination of the foregoing. For example, the sensing layer 680 is sensitive to a pH of a fluid and hence reacts to a pH of the fluid to change a surface potential difference at the sensing layer 680. In the case, the sensing layer 680 is or includes hafnium oxide and/or some other suitable sensing material(s). In some embodiments, the sensing layer 680 is referred to as a bio-sensing layer or bio-sensing film. The sensing layer 680 may have a thickness (as measured in the direction Z) of about 1 nm to about 100 nm, although other suitable thickness may alternatively be utilized. Up to here, a plurality of sensor components 60 are manufactured.

In some embodiments, the sensor components 60 may include one or more than one sensor TFT 60S and one or more than one reference TFT 60R. It is appreciated that, at least one sensor TFT 60S and at least one reference TFT 60R together are referred to as a sensor or sensor device included in the semiconductor device 10. That is, after the formation of the sensor or sensor device, the semiconductor device 10 is manufactured. In other words, structures and configurations of the sensor TFT 60S and the reference TFT 60R are substantially identical to each other. However, the disclosure is not limited thereto; in certain embodiments, sizes and/or shapes (in a plane view) and/or materials of the sensor TFT 60S and the reference TFT 60R may differ from one another based on the demand and design requirements. As shown in FIG. 6, a sidewall 100sw of the interconnect 100 and a sidewall 200sw of the substrate 200 may together confine a sidewall 10sw of the semiconductor device 10.

In some embodiments, the semiconductor device 10 includes the substrate 200 and the interconnect 100 disposed thereon, where the sensor components 60 are embedded inside the interconnect 100. For example, a layer with the sensor components 60 (each including the gate structure 600 (including the gate electrode 610 and the gate dielectric layer 620), the dielectric layer 630, the semiconductor patterns 640, the dielectric 650, the source/drain regions 660, the dielectric layer 670, and the sensing layer 680) formed therein constitutes a build-up layer L5 of the interconnect 100. For example, as shown in FIG. 6, the interconnect 110 includes the build-up layers L1 through L5. In the case, the build-up layer L5 is referred to as a topmost tier/level/layer of the interconnect 100, and the build-up layer L1 is referred to as a bottommost tier/level/layer of the interconnect 100. In other words, the sensor components 60 are posited on the topmost layer of the interconnect 100. In addition, the build-up layer L5 may be referred to as a sensor layer or a sensor region of the interconnect 100 (in FIG. 6). The interconnect 100 may be referred to as an interconnect structure, a redistribution structure, or a routing structure, sometimes.

In some embodiments, the sensing layer 680 is configured to react with or otherwise bind to a target to change a surface potential difference of the sensing layer 680 of the sensor TFT 60S. The change in the surface potential difference of the sensing layer 680 of the sensor TFT 60S changes a threshold voltage of the sensor TFT 60S, which may be used to characterize and/or identify the target. For example, a fluid containing the target may be biased by the reference TFT 60R to induce formation of a channel in the semiconductor pattern 640 of the sensor TFT 60S, and the target may be characterized or identified by an impedance of the induced channel in the sensor TFT 60S.

For example, as shown in FIG. 6 and FIG. 7, during use of the sensor or sensor device, a fluid 800 is placed on the sensing layer 680. As shown in FIG. 7, the fluid 800 may include a plurality of positive ions and a plurality of negative ions, where the positive ions may be considered as a target 802. In the case, the source/drain regions 660 of the reference TFT 60R are respectively biased at a drain voltage Vrd (e.g., about 1.0 V) and at a source voltage Vrs (e.g., about 1.0 V) and the gate electrode 610 of the reference TFT 60R is biased at a gate voltage Vrg (e.g., about 1.0 V), while the sensor TFT 60S are respectively biased at a drain voltage Vsd (e.g., about 0.5 V) and at a source voltage Vss (e.g., about 0 V) and the gate electrode 610 of the sensor TFT 60S is biased at a gate voltage Vsg (e.g., about 0 V). With such, the fluid 800 is biased to induce formation of a channel in the semiconductor pattern 640 of the sensor TFT 60S by having the target 802 (e.g., the positive ions) being repelled from the reference TFT 60R and accumulating on the illustrated top surface of the sensing layer 680 of the sensor TFT 60S and having the negative ions being repelled from the sensor TFT60S and accumulating on the illustrated top surface of the sensing layer 680 of the reference TFT 60R. The biasing causes a channel (not shown) to form (or induced) in the semiconductor pattern 640 (e.g., the channel region) of the sensor TFT 60S and the threshold voltage variations from the target 802 cause variations in an impedance of the channel of the sensor TFT 60S. Hence, the impedance of the channel and/or drain current through the channel in the sensor TFT 60S may be measured to characterize and/or identify the target 802.

However, the disclosure is not limited thereto. For another example, as shown in FIG. 6 and FIG. 8, during use of the sensor or sensor device, a fluid 800 is placed on the sensing layer 680. As shown in FIG. 8, the fluid 800 may include a plurality of positive ions and a plurality of negative ions, where the negative ions may be considered as a target 802. In the case, the source/drain regions 660 of the reference TFT 60R are respectively biased at a drain voltage Vrd (e.g., about −1.0 V) and at a source voltage Vrs (e.g., about −1.0 V) and the gate electrode 610 of the reference TFT 60R is biased at a gate voltage Vrg (e.g., about −1.0 V), while the sensor TFT 60S are respectively biased at a drain voltage Vsd (e.g., about −0.5 V) and at a source voltage Vss (e.g., about 0 V) and the gate electrode 610 of the sensor TFT 60S is biased at a gate voltage Vsg (e.g., about 0 V). With such, the fluid 800 is biased to induce formation of a channel in the semiconductor pattern 640 of the sensor TFT 60S by having the target 802 (e.g., the negative ions) being repelled from the reference TFT 60R and accumulating on the illustrated top surface of the sensing layer 680 of the sensor TFT 60S and having the positive ions being repelled from the sensor TFT60S and accumulating on the illustrated top surface of the sensing layer 680 of the reference TFT 60R. The biasing causes a channel (not shown) to form (or induced) in the semiconductor pattern 640 (e.g., the channel region) of the sensor TFT 60S and the threshold voltage variations from the target 802 cause variations in an impedance of the channel of the sensor TFT 60S. Hence, the impedance of the channel and/or drain current through the channel in the sensor TFT 60S may be measured to characterize and/or identify the target 802.

In other words, the target 802 may react with and/or bind to the sensing layer 680 of the sensor TFT 60S to change a surface potential difference at the sensing layer 680 of the sensor TFT 60S. The change in the surface potential difference at the sensing layer 680 of the sensor TFT 60S may change a threshold voltage of the sensor TFT 60S, which may be used to characterize and/or identify the target 802. In some embodiments, the target 802 is or includes ions, see FIG. 7 and FIG. 8, however the disclosure is not limited thereto. Alternatively, the target 802 may be or include nucleic acids, polarized molecules, antigens, antibodies, enzymes, cells, some other suitable target(s), or any combination thereof. It is appreciated that each sensor component 60 (such as 60S and 60R depending on the demand and/or desired need) formed in the interconnect is biased/controlled/detected by a respective one of the devices (such as the transistors 30, 40, or 50) formed in the substrate 100.

One or more than one sensor TFT 60S and one or more than one reference TFT 60R may be presented in the semiconductor device 10. In some embodiments, as shown in the plane view of FIG. 9, two sensor TFTs 60S and one reference TFT 60R are included and arranged into a form of a straight line, where the reference TFT 60R is laterally disposed between the sensor TFTs 60S. In the case, the sensor TFTs 60S are disposed at two opposite sides of the reference TFT 60R. However, the disclosure is not limited thereto; alternatively, the sensor TFTs 60S are laterally arranged at two adjacent sides of the reference TFT 60R, see FIG. 10. For another non-limiting example, only one sensor TFT 60S and one reference TFT 60R are included and arranged adjacent to each other, see FIG. 11. Alternatively, three sensor TFTs 60S and one reference TFT 60R are included, where the sensor TFTs 60S are arranged at three sides of the reference TFT 60R, see FIG. 12. Or alternatively, four sensor TFTs 60S and one reference TFT 60R are included, where the sensor TFTs 60S are arranged at four sides of the reference TFT 60R, see FIG. 13. Further alternatively, eight sensor TFTs 60S and one reference TFT 60R are included, where the sensor TFTs 60S and the reference TFT 60R are arranged into a form of a matrix (such as the N×N array or N×M arrays (N, M>0, N may or may not be equal to M)), see FIG. 14. In the case, the reference TFT 60R may be posited at the center of the array. However, the disclosure is not limited thereto; alternatively, the reference TFT 60R may be posited at any position in the array. Depending on the demand and/or the design requirement, the number of the sensor TFT 60S and the number of the reference TFT 60R may independently be one or more than one, in one semiconductor device.

Figure 15:
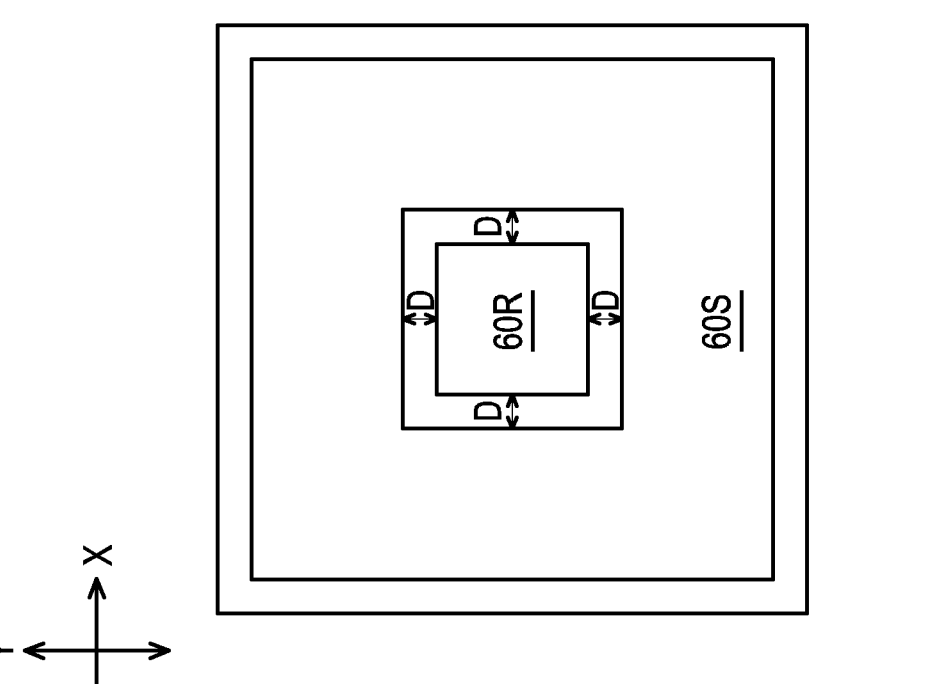
Figure 18:
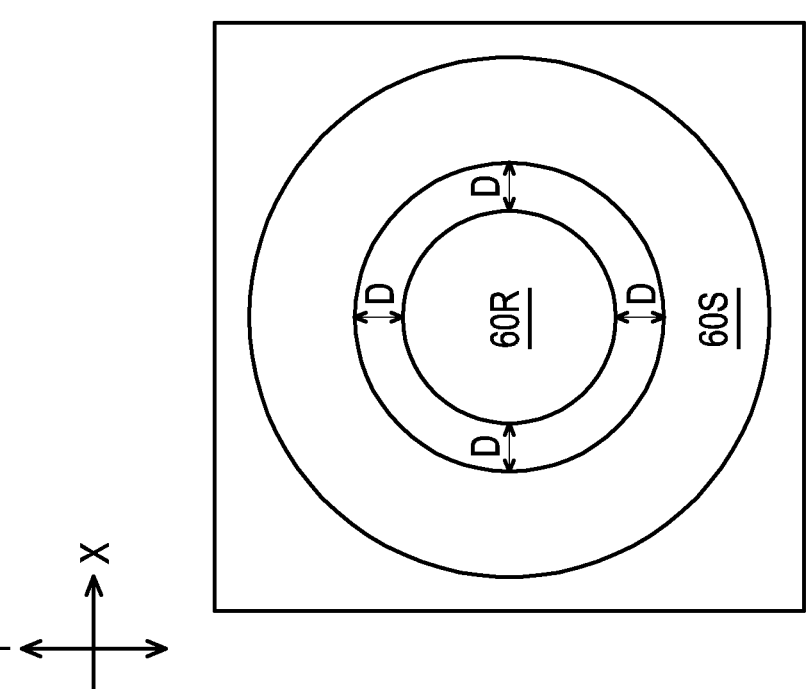
Figure 17:
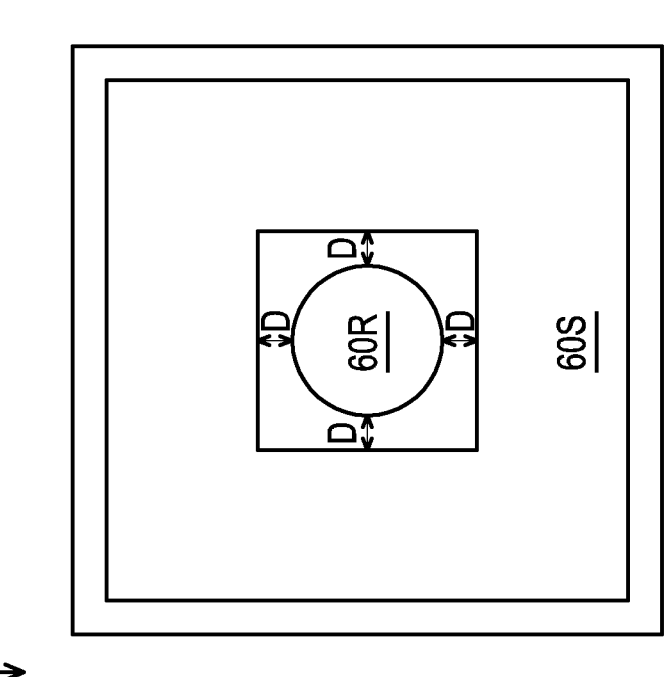

In some embodiments, as shown in the plane views of FIG. 9 through FIG. 14, shapes of the sensor TFTs 60S and the reference TFT 60R are rectangular shapes. However, the disclosure is not limited thereto; alternatively, in the plane views, the shapes of the sensor TFTs 60S and the reference TFT 60R independently may be circular shapes, oval shapes, elliptical shapes, hexagonal shapes, octangular shapes, any other suitable polygonal shapes, or annulus shapes, depending on the demand and design requirements. In addition, the annulus shapes may be circular, oval, elliptical, rectangular, hexagonal, octangular, or any other suitable polygonal. For example, as shown in FIG. 15, the shape of the reference TFT 60R is a rectangular shape while the shape of the sensor TFT 60S is a rectangular, annulus shape, where the sensor TFT 60S surrounds the reference TFT 60R. Alternatively, the shape of the reference TFT 60R is a rectangular shape while the shape of the sensor TFT 60S is a circular, annulus shape, where the sensor TFT 60S surrounds the reference TFT 60R, see FIG. 16. Or alternatively, the shape of the reference TFT 60R is a circular shape while the shape of the sensor TFT 60S is a rectangular, annulus shape, where the sensor TFT 60S surrounds the reference TFT 60R, see FIG. 17. Further alternatively, the shape of the reference TFT 60R is a circular shape while the shape of the sensor TFT 60S is a circular, annulus shape, where the sensor TFT 60S surrounds the reference TFT 60R, see FIG. 18.

In some alternative embodiments, positioning locations of the sensor TFTs 60S and the reference TFT 60R shown in FIG. 9 through FIG. 18 are interchangeable. The disclosure is not limited thereto. As shown in FIG. 9 through FIG. 18 (in conjunction with FIG. 6), a distance D between two adjacent sensor components 60 (such as between sensor TFTs 60S, between one sensor TFT 60S and one reference TFT 60R, and/or between references TFTs 60R) may be (as measured in the direction X or the direction Y) approximately in the range of 10 nm to 1000 nm, although other suitable thickness may alternatively be utilized. The disclosure is not limited thereto.

Figure 19:
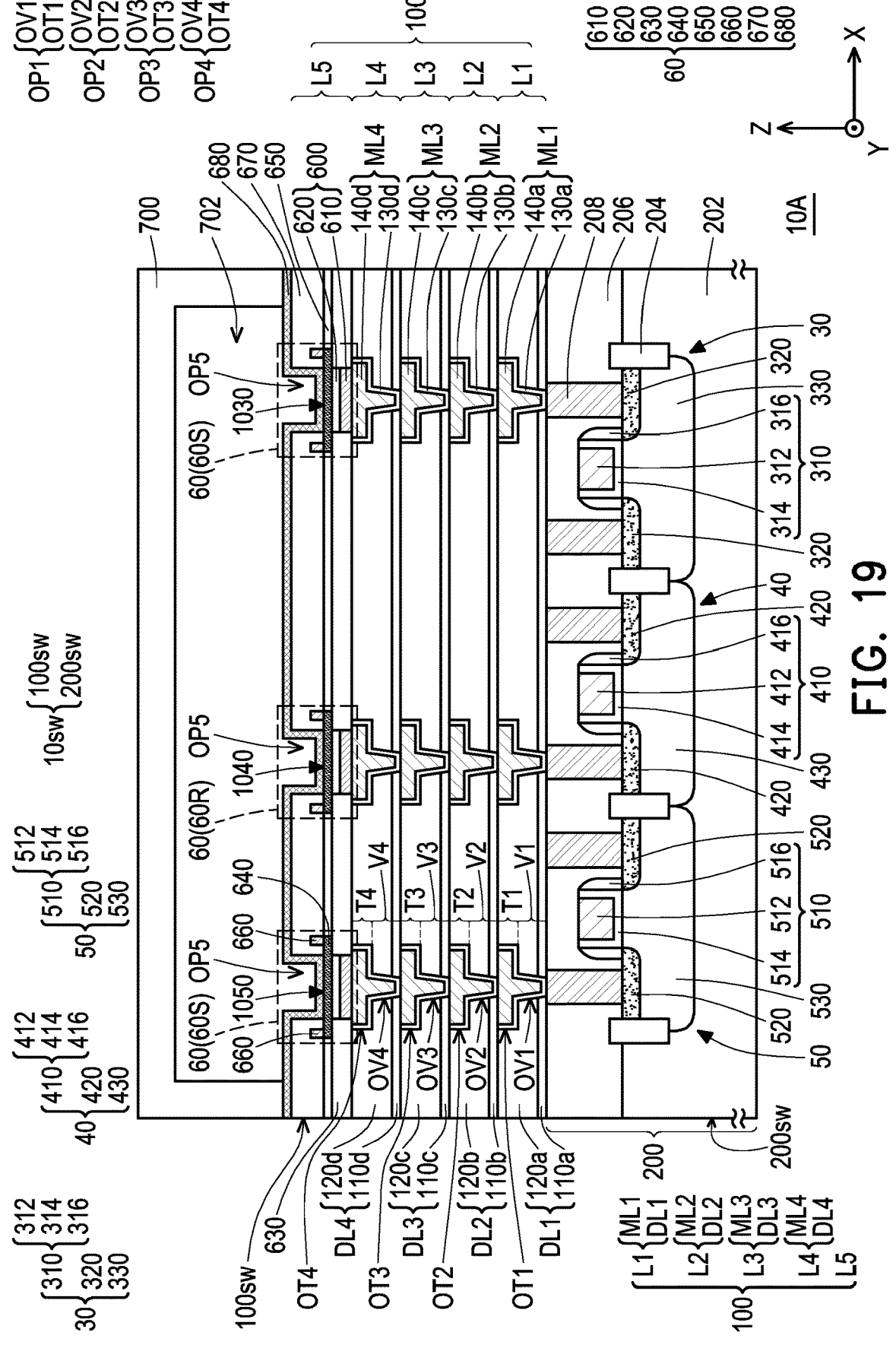
FIG. 19 is a schematic cross-sectional view of a semiconductor device in accordance with some embodiments of the disclosure.

The semiconductor device may further be equipped with a cap. FIG. 19 is a schematic cross-sectional view of a semiconductor device 10A in accordance with some embodiments of the disclosure. The elements similar to or substantially the same as the elements described above will use the same reference numbers, and certain details or descriptions of the same elements (e.g., the formations and materials) and the relationship thereof (e.g., the relative positioning configuration and electrical connection) will not be repeated herein. Referring to FIG. 19, in some embodiments, the package structure 10A is manufactured by providing a cap 700 and mounting the lid 700 onto the interconnect 100, following the process as described in FIG. 6. The cap 700 may include one or more than one opening for the fluid (800 in FIG. 7 and FIG. 8) to be in and out of the semiconductor device 10A for testing. The cap 700 may include a plurality of microchannels (not shown) formed therein. In some embodiments, the microchannels are or include micro fluid channels, which is capable of providing functionality of filtering, fluid guiding, solution mixing, heating, cooling, etc.; the disclosure is not limited thereto. Owing the cap 700 being or including micro fluid channels, a better entrance of the fluid to the sensor or sensor device is ensured. The cap 700 may be made of a dielectric material, such as Polydimethylsiloxane (PDMS) or the like. In some embodiments, the cap 700 is mounted on the interconnect 100, where the interconnect 100 is disposed between the cap 700 and the substrate 200. For example, as shown in FIG. 19, the cap 700 includes a recess 702, where the recess 702 is overlying and spatially communicated to the openings OP5. In such case, the recess 702 and the opening OP5 together confine an accommodating space (or a cavity) for the fluid 800 inside the semiconductor device 10A. The mounting process may include thermal bonding, soldering bonding, or the like.

Figure 20:
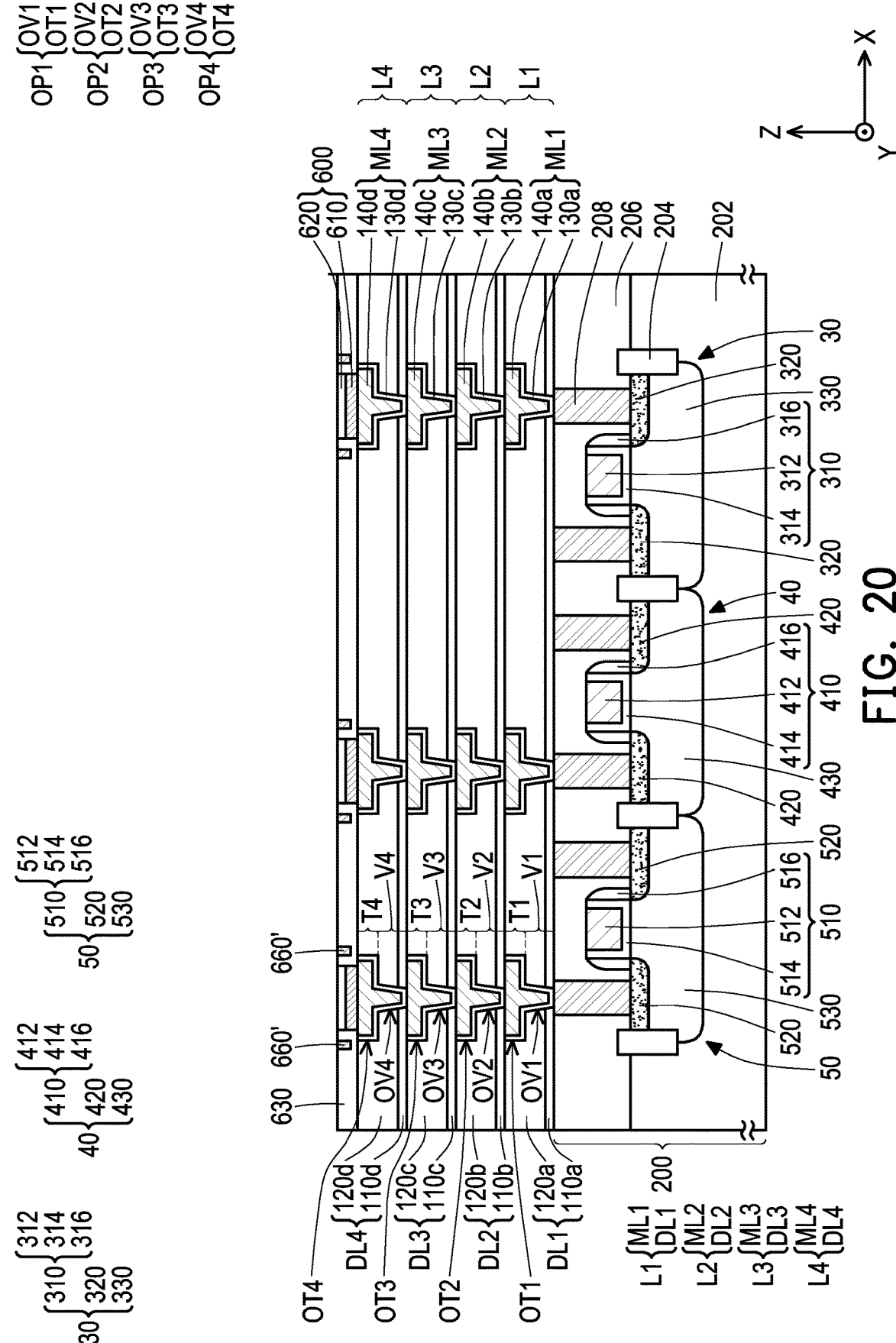
FIG. 20 through FIG. 22 are schematic cross-sectional views of various stages in a manufacturing method of a semiconductor device in accordance with some alternative embodiments of the disclosure.
Figure 21:
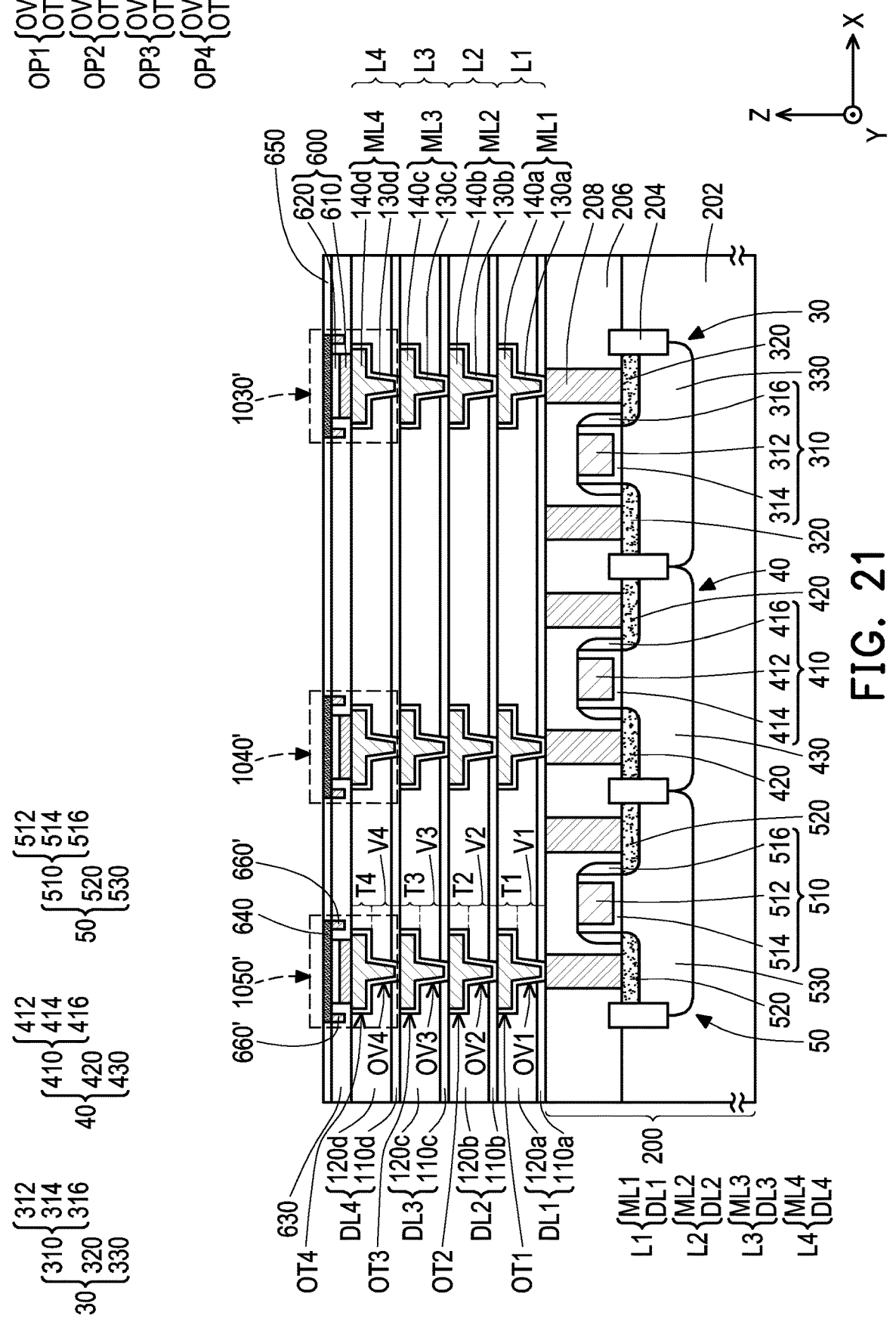
Figure 22:
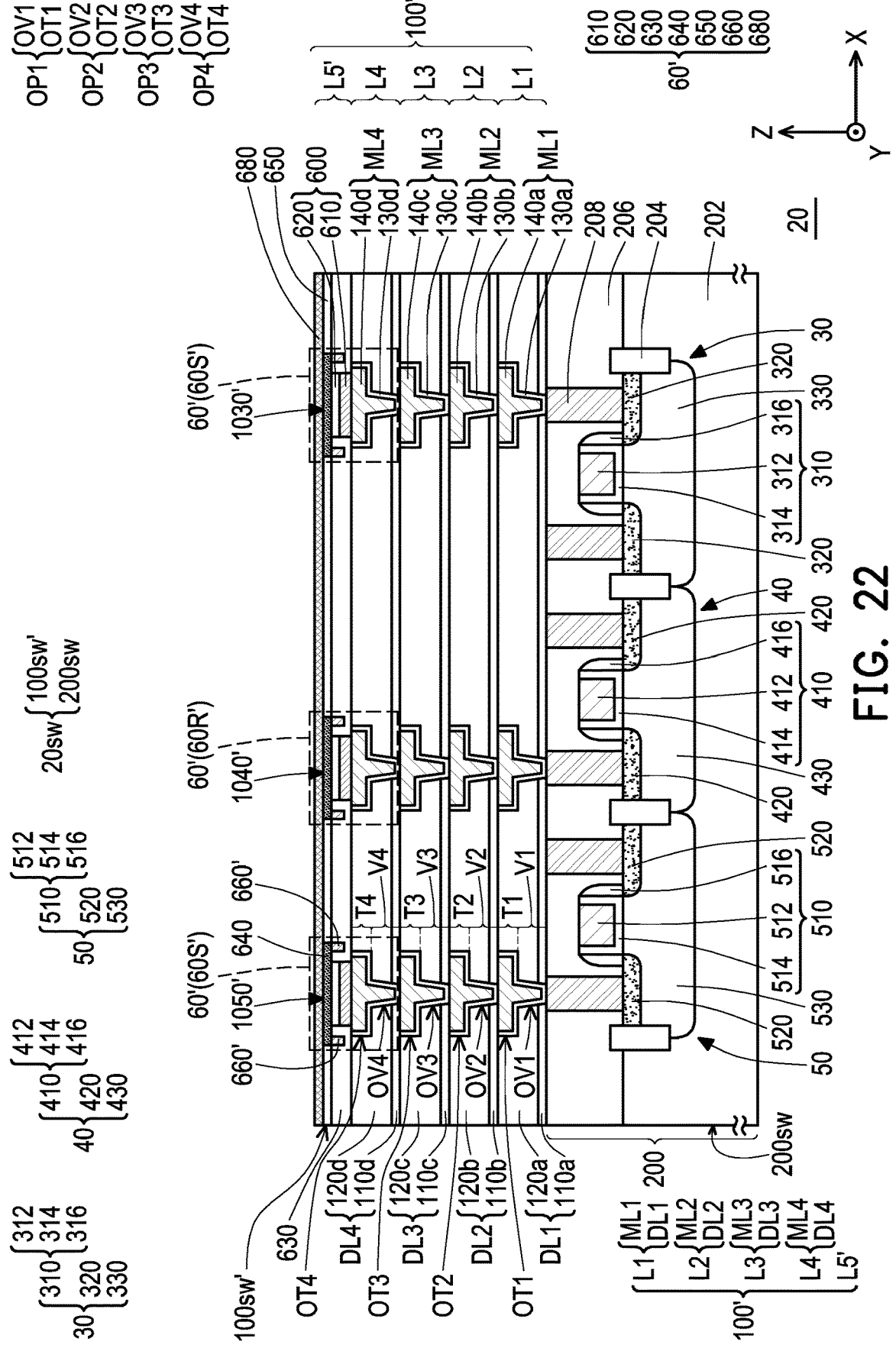
Figure 23:
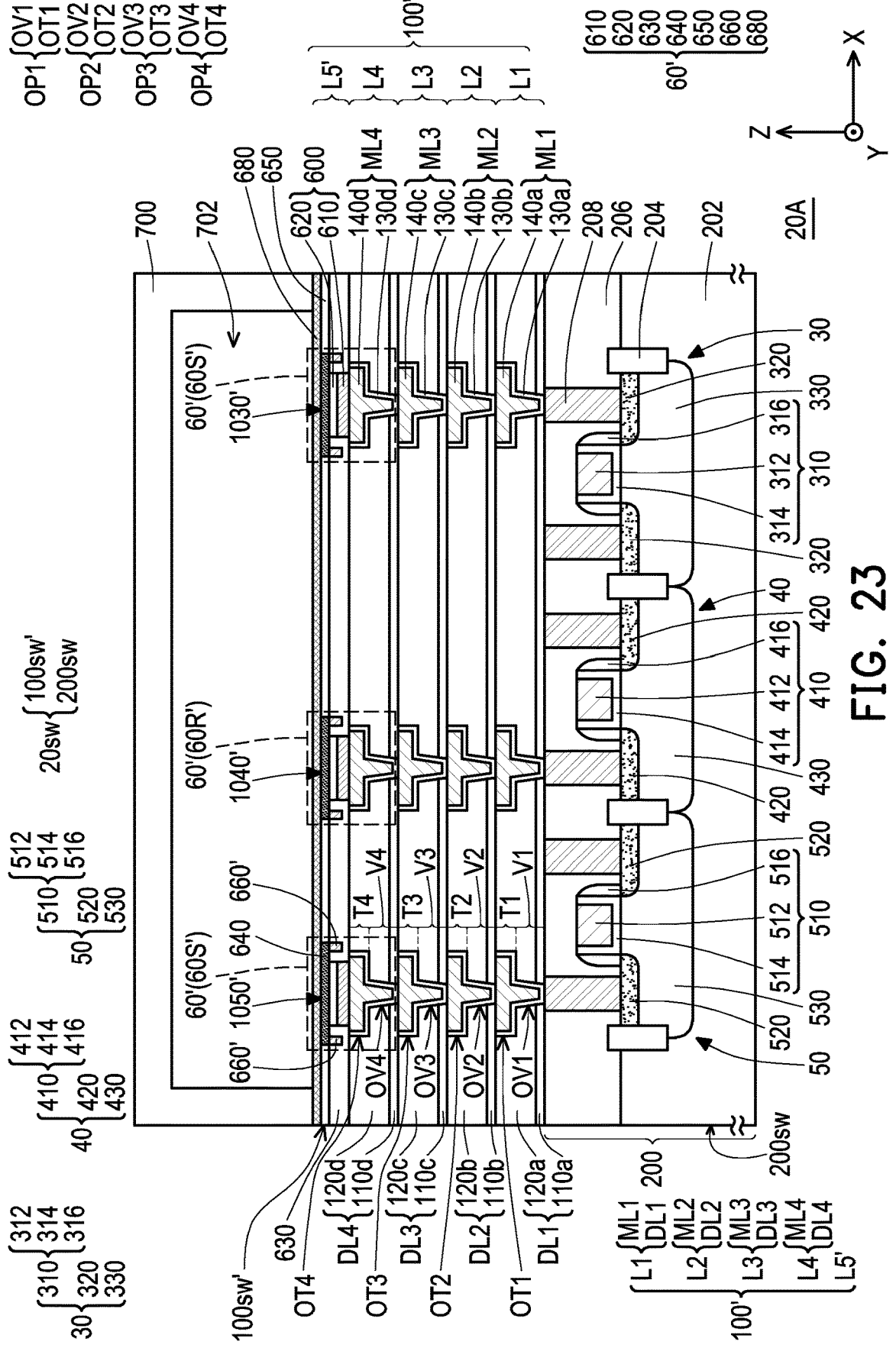
FIG. 23 is a schematic cross-sectional view of a semiconductor device in accordance with some alternative embodiments of the disclosure.

FIG. 20 through FIG. 22 are schematic cross-sectional views of various stages in a manufacturing method of a semiconductor device in accordance with some alternative embodiments of the disclosure. FIG. 23 is a schematic cross-sectional view of a semiconductor device in accordance with some alternative embodiments of the disclosure. The elements similar to or substantially the same as the elements described above will use the same reference numbers, and certain details or descriptions of the same elements (e.g., the formations and materials) and the relationship thereof (e.g., the relative positioning configuration and electrical connection) will not be repeated herein.

Referring to FIG. 20, in some embodiments, a plurality of source/drain regions 660' are formed next to the gate structures 600, following the process as described in FIG. 2. For example, a pair of the source/drain regions 660' are disposed at two opposite sides of a respective one the gate structures 600. As shown in FIG. 20, the source/drain regions 660' may be separated apart from the gate structures 600. In the case, the source/drain regions 660' are formed by, but not limited to, patterning the dielectric layer 630 to form a plurality of openings (not labeled) in the dielectric layer 630; and filling a conductive material in the openings to form the source/drain regions 660'. The patterning may include photolithography and etching process. The conductive material used for forming the source/drain regions 660' may be similar to or substantially identical to the conductive material used for forming the source/drain regions 660, and thus is not repeated herein. A planarizing step may be performed to obtain a high degree of coplanarity between the illustrated top surfaces of the source/drain regions and the illustrated top surface of the dielectric layer 630. After the planarizing step, a cleaning step may be optionally performed, for example to clean and remove the residue generated from the planarizing step.

Referring to FIG. 21, in some embodiments, a plurality of semiconductor patterns 640 are formed over the gate structures 600 and the source/drain regions 660', and a dielectric layer 650 is then formed to laterally cover the semiconductor patterns 640. For example, as shown in FIG. 21, the semiconductor patterns 640 are disposed on the gate dielectric patterns 620 and extends between a pair of the source/drain regions 660', respectively. In that case, the semiconductor patterns 640 are respectively overlapped with the gate electrodes 610 and the source/drain regions 660', in the direction Z. As shown in FIG. 21, the semiconductor patterns 640 are accessibly revealed by the dielectric layer 650, for example. In some embodiments, illustrated top surface of the semiconductor patterns 640 are substantially level with an illustrated top surface of the dielectric layer 650. In other words, the illustrated top surface of the semiconductor patterns 640 are substantially coplanar to the illustrated top surface of the dielectric layer 650. The formations and materials of the semiconductor patterns 640 and the dielectric layer 650 have been previously described in FIG. 3, and thus are not repeated herein. Up to here, the TFTs 1030', 1040', and 1050' are manufactured. In some embodiment, each of the TFTs 1030', 1040', and 1050' includes one gate structure 600 (including one gate electrode 610 and one gate dielectric pattern 620), one semiconductor pattern 640, and one pair of source/drain regions 660', where the TFTs 1030', 1040', and 1050' are separated from one another. In some embodiments, structures and configurations of the TFTs 1030', 1040', and 1050' are substantially identical to each other. Owing to the configurations of the TFTs 1030-1050, their fabrication is able to formed in the interconnect during the BEOL processes, thus the manufacturing process of the semiconductor device 20 is simplified, thereby lowering the manufacturing cost.

In some embodiments, the gate electrodes 610 of the gate structures 600 each are referred to as a gate of a TFT (e.g., the TFTs 1030', 1040', and 1050'), one pair of the source/drain regions 660' underlying the same semiconductor pattern 640 and disposed at two opposite sides of a respective one gate electrode 610 each are referred to as a source/drain element of a TFT (e.g., the TFTs 1030', 1040', and 1050'), and a portion of each of the semiconductor patterns 640 sandwiched between one pair of the source/drain regions 660' underlying thereto is referred to as a channel or a channel region of a TFT (e.g., the TFTs 1030', 1040', and 1050'), where a conduction status of the channel or the channel region is controlled by a voltage applied or induced onto the gate electrode 610. In the case, the conduction status of the channel or the channel region can be detected and/or controlled by the devices (such as the transistor 30, the transistor 40, and the transistor 50) electrically coupled thereto. In some embodiments, the gate dielectric patterns

620 formed in the same process may together be referred to as a gate dielectric layer. In some embodiments, the semiconductor patterns 640 formed in the same process may together be referred to as a semiconductor layer. Owing to the semiconductor patterns 640, the TFTs (e.g., the TFTs 1030', 1040', and 1050') may be considered as low-temperature TFTs, which is able to be formed in the BEOL process. As illustrated in FIG. 21, the TFT 1030' is electrically coupled to and electrically communicated to the transistor 30 formed in the substrate 200 through the build-up layers L1-L4 and at least one of the conductive plugs 208, the TFT 1040' is electrically coupled to and electrically communicated to the transistor 40 formed in the substrate 200 through the build-up layers L1-L4 and at least one of the conductive plugs 208, and the TFT 1050' is electrically coupled to and electrically communicated to the transistor 50 formed in the substrate 200 through the build-up layers L1-L4 and at least one of the conductive plugs 208, in some embodiments. The details of the substrate 200 and the build-up layers L1-L4 have previously described in FIG. 1, and thus are not repeated herein.

Referring to FIG. 22, in some embodiments, a sensing layer 680 is formed on the structure depicted in FIG. 21 to cover up the semiconductor patterns 640 and the dielectric layer 650. The formation and material of the sensing layer 680 have been previously described in FIG. 6, and thus are not repeated herein for brevity. Up to here, a plurality of sensor components 60' are manufactured. In some embodiments, the sensor components 60' may include one or more than one sensor TFT 60S' and one or more than one reference TFT 60R'. It is appreciated that, at least one sensor TFT 60S' and at least one reference TFT 60R' together are referred to as a sensor or sensor device included in the semiconductor device 20. In other words, structures and configurations of the sensor TFT 60S' and the reference TFT 60R' are substantially identical to each other.

That is, after the formation of the sensor or sensor device, the semiconductor device 20 is manufactured. As shown in FIG. 22, a sidewall 100sw' of the interconnect 100' and a sidewall 200sw of the substrate 200 may together confine a sidewall 20sw of the semiconductor device 20. In some embodiments, the semiconductor device 20 includes the substrate 200 and an interconnect 100' disposed thereon, where the sensor components 60' are embedded inside the interconnect 100'. For example, a layer with the sensor components 60' (each including the gate structure 600 (including the gate electrode 610 and the gate dielectric layer 620), the dielectric layer 630, the semiconductor patterns 640, the dielectric 650, the source/drain regions 660', and the sensing layer 680) formed therein constitutes a build-up layer L5' of the interconnect 100'. For example, as shown in FIG. 22, the interconnect 110' includes the build-up layers L1 through L5'. In the case, the build-up layer L5' is referred to as a topmost tier/level/layer of the interconnect 100', and the build-up layer L1 is referred to as a bottommost tier/level/layer of the interconnect 100'. In other words, the sensor components 60' are posited on the topmost layer of the interconnect 100'. In addition, the build-up layer L5' may be referred to as a sensor layer or a sensor region of the interconnect 100' (in FIG. 22). The interconnect 100' may be referred to as an interconnect structure, a redistribution structure, or a routing structure, sometimes.

The principle mechanisms, configurations and modifications of the sensor components 60 (including the sensor TFTs 60S and the reference TFT 60R), which have been discussed in FIG. 7 through FIG. 18, are also applied to the sensor components 60' (including the sensor TFTs 60S' and the reference TFT 60R'), and thus are not repeated herein for brevity.

Referring to FIG. 23, in some embodiments, a semiconductor device 20A is similar to the semiconductor device 20 of FIG. 22; that is, the structures, materials, and functions of the semiconductor device 20A are similar to those of the semiconductor device 20, and thus the details are omitted herein. The main difference between the semiconductor device 20A and the semiconductor device 20 lies in that the semiconductor device 20A further includes a cap 700 mounted on the interconnect 100', where the interconnect 100' is disposed between the cap 700 and the substrate 200. The details (e.g., the material, configuration or the like) of the cap 700 have been described in FIG. 19, and thus are not repeated herein.

In some alternative embodiments, the semiconductor devices 10, 10A, 20, 20A and their modifications independently are referred to as a semiconductor die, a semiconductor chip, a semiconductor integrated circuit (IC), or the like. On the other hand, for example, the sensor TFTs 60S and/or 60S' independently are referred to as a sensing element while the reference TFTs 60R and/or 60R' independently are referred to as a reference element. The disclosure is not limited thereto. A number of sensor or sensor device may be one (as described in the drawings of the embodiments herein) or multiple, the disclosure is not limited thereto. In embodiments of the multiple sensors or sensor devices are employed, the types and/or arrangement of the sensor components of the multiple sensors or sensor devices may be different, in part or all. Or, in embodiments of the multiple sensors or sensor devices are employed, the types and/or arrangement of the sensor components of the more than one sensor or sensor device may be substantially identical to one another. The number of the sensors or sensor devices included in one semiconductor device may be selected and designed based on the demand and design requirements.

In accordance with some embodiments, a semiconductor device includes a substrate, an interconnect, and a sensor. The substrate includes devices therein and has a front side and a rear side opposite to the front side. The interconnect is disposed on the front side and electrically coupled to the devices. The sensor is disposed over the substrate and in the interconnect, and includes a sensing element and a reference element. The sensing element is disposed in a topmost layer of the interconnect and exposed therefrom, where the sensing element is electrically coupled to a first device of the devices through the interconnect. The reference element is disposed in the topmost layer of the interconnect and exposed therefrom, where the reference element is laterally spaced from the sensing element and is electrically coupled to a second device of the devices through the interconnect.

In accordance with some embodiments, a semiconductor device includes a substrate, an interconnect structure, and at least one sensor. The substrate includes a first device, a second device, and a third device. The interconnect structure is disposed on the substrate and electrically coupled to the first device, the second device and the third device. The at least one sensor is disposed in the interconnect and exposed therefrom, and the at least one sensor includes a first gate electrode and a second gate electrode, a first semiconductor layer and a second semiconductor layer, a pair of first source/drain regions, a pair of second source/drain regions, a passivation layer, and a sensing layer. The first gate electrode and the second gate electrode are disposed on the interconnect, and electrically coupled to the first device and the second device through the interconnect, respectively. The first semiconductor layer and the second semiconductor layer are disposed on the first gate electrode and the second gate electrode, respectively. The pair of first source/drain regions are disposed at two opposite sides of the first gate electrode and overlapped with the first semiconductor layer. The pair of second source/drain regions are disposed at two opposite sides of the second gate electrode and overlapped with the second semiconductor layer. The passivation layer is disposed over the substrate and covers the pair of first source/drain regions and the pair of second source/drain regions, where a plurality of openings formed in the passivation layer expose the first semiconductor layer and the second semiconductor layer. The sensing layer is disposed on the passivation layer and extends into the plurality of openings to lie against the first semiconductor layer and the second semiconductor layer exposed by the plurality of openings.

In accordance with some embodiments, a method of method of manufacturing a semiconductor device includes the following steps: providing a substrate comprising devices therein, the substrate having an front side and a rear side opposite to the front side; disposing an interconnect on the front side and electrically coupling the interconnect to the devices; and forming a sensor over the substrate and in the interconnect, the sensor comprising a sensing element and a reference element disposed in a topmost layer of the interconnect and exposed therefrom, the sensing element being electrically coupled to a first device of the devices through the interconnect, and the reference element being laterally spaced from the sensing element and electrically coupled to a second device of the devices through the interconnect.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure.

What is claimed is:

1. A semiconductor device, comprising:
a substrate, comprising devices therein, and having a front side and a rear side opposite to the front side;
an interconnect, disposed on the front side and electrically coupled to the devices; and
a sensor, disposed over the substrate and in the interconnect, comprising:
a sensing element, disposed in a topmost layer of the interconnect and exposed therefrom, wherein the sensing element is electrically coupled to a first device of the devices, and comprising:
a first gate electrode;
a first semiconductor layer, disposed over the first gate electrode;
a pair of first source/drain regions, vertically disposed over the first semiconductor layer; and
a first sensing layer, disposed on the first semiconductor layer and over the first gate electrode; and
a reference element, disposed in the topmost layer of the interconnect and exposed therefrom, wherein the reference element is laterally spaced from the sensing element and is electrically coupled to a second device of the devices, and comprising:

a second gate electrode;

a second semiconductor layer, disposed over the second gate electrode;

a pair of second source/drain regions, vertically disposed over the second semiconductor layer; and a second sensing layer, disposed on the second semiconductor layer and over the second gate electrode.

2. The semiconductor device of claim 1, wherein the sensing element further comprises:

a first gate structure, comprising the first gate electrode and a first gate dielectric layer disposed thereon, wherein the pair of first source/drain regions stand on the first semiconductor layer, and the first semiconductor layer is vertically between the first gate structure and the pair of first source/drain regions, and, the reference element further comprises:

a second gate structure, comprising the second gate electrode and a second gate dielectric layer disposed thereon, wherein the pair of second source/drain regions stand on the second semiconductor layer, and the second semiconductor layer is vertically between the second gate structure and the pair of second source/drain regions.

3. The semiconductor device of claim 2, wherein the sensor further comprises at least one additional sensing element, and the at least one additional sensing element comprises:

a third gate structure, comprising a third gate electrode and a third gate dielectric layer disposed thereon;

a third semiconductor layer, disposed on the third gate structure and over the third gate electrode;

a pair of third source/drain regions, standing on the third semiconductor layer, wherein the third semiconductor layer is between the third gate structure and the pair of third source/drain regions; and a third sensing layer, disposed on the third semiconductor layer and over the third gate electrode.

4. The semiconductor device of claim 1, wherein the sensing element further comprises:

a first gate structure, comprising the first gate electrode and a first gate dielectric layer disposed thereon, wherein the pair of first source/drain regions stand underneath the first semiconductor layer and laterally next to and spacing apart from the first gate structure, and the reference element further comprises:

a second gate structure, comprising the second gate electrode and a second gate dielectric layer disposed thereon, wherein the pair of second source/drain regions stand underneath the second semiconductor layer and laterally next to and spacing apart from the second gate structure.

5. The semiconductor device of claim 4, wherein the sensor further comprises at least one additional sensing element, and the at least one additional sensing element comprises:

a third gate structure, comprising a third gate electrode and a third gate dielectric layer disposed thereon;

a pair of third source/drain regions, disposed next to and spacing apart from the third gate structure;

a third semiconductor layer, disposed on the third gate structure and the pair of third source/drain regions, wherein the third semiconductor layer extends from one of the pair of third source/drain regions to other one of the pair of third source/drain regions, and a third sensing layer, disposed on the third semiconductor layer and over the third gate electrode.

6. The semiconductor device of claim 1, wherein the sensing element is laterally separated from the reference element by a distance approximately ranging from 10 nm to 1000 nm.

7. The semiconductor device of claim 1, wherein the sensing element comprising a plurality of sensing elements, and the reference element and the plurality of sensing element are arranged in form of an array.

8. The semiconductor device of claim 1, wherein:

the sensing element is enclosed inside an inner sidewall of the reference element, or the reference element is enclosed inside an inner sidewall of the sensing element.

9. The semiconductor device of claim 1, further comprising a cap disposed on the interconnect, wherein a cavity configured to accommodate a fluid having a to-be-tested target is formed between the cap and the interconnect, and the sensor is exposed to the cavity.

10. A method of manufacturing a semiconductor device, comprising:

providing a substrate comprising devices therein, the substrate having a front side and a rear side opposite to the front side;

disposing an interconnect on the front side and electrically coupling the interconnect to the devices; and forming a sensor over the substrate and in the interconnect, the sensor comprising a sensing element and a reference element disposed in a topmost layer of the interconnect and exposed therefrom, wherein the sensing element is electrically coupled to a first device of the devices and comprises a first gate electrode, a first semiconductor layer disposed over the first gate electrode, a pair of first source/drain regions vertically disposed over the first semiconductor layer, and a first sensing layer disposed on the first semiconductor layer and over the first gate electrode, and wherein the reference element is laterally spaced from the sensing element and electrically coupled to a second device of the devices, and the reference element comprises a second gate electrode, a second semiconductor layer disposed over the second gate electrode, a pair of second source/drain regions vertically disposed over the second semiconductor layer, and a second sensing layer disposed on the second semiconductor layer and over the second gate electrode.

11. The method of claim 10, wherein forming the sensing comprises:

forming the sensing element, comprising:

providing a first gate structure comprising the first gate electrode and a first gate dielectric layer disposed thereon;

disposing the first semiconductor layer on the first gate structure and over the first gate electrode;

forming the pair of first source/drain regions standing on the first semiconductor layer, the first semiconductor layer being between the first gate structure and the pair of first source/drain regions; and disposing the first sensing layer on the first semiconductor layer and over the first gate electrode; and forming the reference element, comprising:

providing a second gate structure comprising the second gate electrode and a second gate dielectric layer disposed thereon;

disposing the second semiconductor layer on the second gate structure and over the second gate electrode;

forming the pair of second source/drain regions standing on the second semiconductor layer, the second semiconductor layer being between the second gate structure and the pair of second source/drain regions; and disposing the second sensing layer on the second semiconductor layer and over the second gate electrode.

12. The method of claim 11, wherein:

forming the sensing element further comprises:

disposing a first passivation layer over the first semiconductor layer prior to disposing the first sensing layer and after forming the pair of first source/drain regions, the first passivation layer comprising a first opening exposing the first semiconductor layer, wherein the first sensing layer extends into the first opening to be in contact with the first semiconductor layer, and forming the reference element further comprises:

disposing a second passivation layer over the second semiconductor layer prior to disposing the second sensing layer and after forming the pair of second source/drain regions, the second passivation layer comprising a second opening exposing the second semiconductor layer, wherein the second sensing layer extends into the second opening to be in contact with the second semiconductor layer.

13. The method of claim 10, wherein forming the sensing comprising:

forming the sensing element, comprising:

providing a first gate structure comprising the first gate electrode and a first gate dielectric layer disposed thereon;

forming the pair of first source/drain regions next to and spacing apart from the first gate structure;

disposing the first semiconductor layer on the first gate structure and the pair of first source/drain regions, the first semiconductor layer extending from one of the pair of first source/drain regions to other one of the pair of first source/drain regions; and disposing the first sensing layer on the first semiconductor layer and over the first gate electrode; and forming the reference element, comprising:

providing a second gate structure comprising the second gate electrode and a second gate dielectric layer disposed thereon;

forming the pair of second source/drain regions next to and spacing apart from the second gate structure;

disposing the second semiconductor layer on the second gate structure and the pair of second source/drain regions, the second semiconductor layer extending from one of the pair of second source/drain regions to other one of the pair of second source/drain regions; and disposing the second sensing layer on the second semiconductor layer and over the second gate electrode.

14. The method of claim 10, further comprising:

disposing a cap on the interconnect to form a cavity between the cap and the interconnect, wherein the cavity is configured to accommodate a fluid having a to-be-tested target, and the sensor is exposed to the cavity.

15. The semiconductor device of claim 1, wherein the sensing element comprising a plurality of sensing elements, and the reference element and the plurality of sensing element are arranged in form of a line, in a plane view.

16. The semiconductor device of claim 1, wherein the sensing element comprising a plurality of sensing elements, and the plurality of sensing element are arranged at two opposite edges of the reference element, in a plane view.

17. The semiconductor device of claim 1, wherein the sensing element comprising a plurality of sensing elements, and the plurality of sensing element are arranged at two or more edges of the reference element, in a plane view.

18. The semiconductor device of claim 1, wherein the sensing element surrounds the reference element, in a plane view.

19. The semiconductor device of claim 18, wherein a shape of the sensing element comprises a rectangular frame shape or a circular frame shape, in the plane view.

20. The semiconductor device of claim 18, wherein a shape of the reference element comprises a rectangular shape or a circular shape, in the plane view.

* * * * *